(12) United States Patent
Roos

(10) Patent No.: US 10,557,722 B2
(45) Date of Patent: Feb. 11, 2020

(54) SYSTEM FOR DETERMINING THE POSITION OF THE POSITION INDICATOR OF A POSITION MEASURING SYSTEM

(71) Applicants: NM Numerical Modelling GmbH, Zug (CH); maglab AG, Basel (CH)

(72) Inventor: Markus Roos, Baar (CH)

(73) Assignees: NM Numerical Modelling GmbH (CH); maglab AG (CH)

( * ) Notice: Subject to any disclaimer, the term of this patent is extended or adjusted under 35 U.S.C. 154(b) by 0 days.

(21) Appl. No.: 15/694,798

(22) Filed: Sep. 3, 2017

(65) Prior Publication Data

US 2018/0080796 A1 Mar. 22, 2018

(30) Foreign Application Priority Data

Sep. 16, 2016 (CH) ........................................ 1207/16
Apr. 19, 2017 (EP) ..................................... 17167135

(51) Int. Cl.
*G01D 5/14* (2006.01)
*G01D 5/244* (2006.01)
(Continued)

(52) U.S. Cl.
CPC ............... *G01D 5/14* (2013.01); *G01D 5/145* (2013.01); *G01D 5/24452* (2013.01);
(Continued)

(58) Field of Classification Search
CPC .. G01D 5/14; G01D 5/24476; G01D 5/24452; G01D 5/145; H02K 11/215; H02P 6/16
See application file for complete search history.

(56) References Cited

U.S. PATENT DOCUMENTS 6,404,052 B1 * 6/2002 Kurita ............... H01L 23/49822
257/735
7,030,782 B2 * 4/2006 Ely ....................... G01D 5/2073
178/18.07
(Continued)

FOREIGN PATENT DOCUMENTS

WO 02065247 A2 8/2002
WO 2005124286 A1 12/2005

OTHER PUBLICATIONS

European Patent Office, European Patent Search Report for EP-17-16-7135 dated Oct. 24, 2017.

*Primary Examiner* — Mischita L Henson
(74) *Attorney, Agent, or Firm* — CanaanLaw, P.C.; David B. Ritchie

(57) ABSTRACT

The invention concerns a method for determining a position $\phi$ of a position indicator of a position measuring system, in which the sensor signals $a_1$ to $a_r$ of a number of r sensors are recorded as a signal vector $\vec{a}=(a_1, \ldots, a_r)$, a measurement vector $\vec{q}$ is formed according to $\vec{q}=g(\vec{a})$, a 2-component vector $\vec{p}$ is calculated according to $\vec{p}=M\cdot\vec{q}$, wherein M is a 2×n matrix, and the position $\phi$ is determined by means of a predetermined function $f(\vec{p})$ to $\phi=f(\vec{p})$, wherein the function $f(\vec{p})=f(p_1,p_2)$ is based on the equations $p_1=\cos(\phi)$ and $p_2=\sin(\phi)$. The matrix M is determined in a calibration phase in such a manner, that the transformation $\vec{p}=M\cdot\vec{q}$ is a linear mapping, which maps a number m of measurement vectors $\vec{q}_k$ on 2-component vectors $\vec{p}_k$, wherein the tips of the vectors $\vec{p}_k$ substantially lie on a circle or on a circular arc. The method allows the elimination of external fields.

21 Claims, 5 Drawing Sheets

(51) Int. Cl.
   *H02K 11/215*   (2016.01)
   *H02P 6/16*     (2016.01)
(52) U.S. Cl.
   CPC ....... *G01D 5/24476* (2013.01); *H02K 11/215* (2016.01); *H02P 6/16* (2013.01)

(56) References Cited

U.S. PATENT DOCUMENTS

| | | | |
|---|---|---|---|
| 7,406,393 B2 * | 7/2008 | Ely | G06F 1/3203 |
| | | | 702/150 |
| 7,620,514 B2 | 11/2009 | Steinlechner | |
| 2011/0067479 A1 | 3/2011 | Davis et al. | |
| 2015/0048242 A1 | 2/2015 | Remillard et al. | |

* cited by examiner

SYSTEM FOR DETERMINING THE POSITION OF THE POSITION INDICATOR OF A POSITION MEASURING SYSTEM

PRIORITY CLAIM

Applicant hereby claims foreign priority under 35 U.S.C § 119 from Swiss Patent Application No. 01207/16 filed on Sep. 16, 2016 and from European Patent Application No. 17167135.7 filed on Apr. 19, 2017, the disclosures of which are herein incorporated by reference.

FIELD OF THE INVENTION

The invention concerns methods for determining the position of the position indicator of a position measuring system, in particular a method for determining the position of a position indicator of a linear position measuring system or of the position indicator of an angle measurement system.

BACKGROUND OF THE INVENTION

Various sensor systems for measuring the position $\phi$ of a rotating or linearly moving position indicator are known, in which the information to be obtained is represented by sine and cosine shaped varying raw signals $p_1=\cos(\phi)$ and $p_2=\sin(\phi)$. Possible implementations include e.g. the measurement of components of the induction field of a permanent magnet at suitable locations in space. The searched position is then determined from $p_1$, $p_2$ e.g. via the function $\phi=a\tan 2(p_2,p_1)$ by means of the function a tan 2 known from the C-programming language. These prerequisites severely restrict possible arrangements of sensor elements and position indicator, and in particular require a high degree of accuracy in their production or the relative positioning of the sensor chip and the position indicator, respectively.

A fundamental difficulty with these methods is that a non-ideal arrangement of the position indicator and the sensor chip leads to distortions of the raw signals, in particular that these no longer have the pure sine and cosine shape and thus lead to an inaccurate determination of the position $\phi$. There exist methods to improve the raw signal quality, e.g. by using offset and amplitude corrections. A method for a sensor arrangement with two sensors known from WO 2005124286 is based on a description of the measuring points as ellipses and requires specific calibration measurements, which provide parameters for the corrections and which can be realized in practice only with considerable effort. This method requires great care in the design of the sensor arrangement and especially in the adjustment of the permanent magnet, so that the measured values lie sufficiently precisely on an ellipse. If the actual rotational axis does not pass through the magnetically defined center of the permanent magnet, the correction can even cause the opposite effect of an increase in the angular error.

In many instances, a position sensing system is responsive to external fields (e.g., the earth's magnetic field in the case of a position indicator based on permanent magnets). Without countermeasures, these additional field components cannot be distinguished from the useful field so that the external fields restrict the accuracy of the position measuring system.

A fundamental challenge for position measuring systems is their long-term stability, i.e., an initially sufficiently accurate calibration changes over time, e.g. by mechanical displacement of the components relative to one another or by drifting of electronic sensor properties. However, the measurement quality of systems during normal operation is not ascertainable according to the state of the art, in particular this cannot take place intrinsically, i.e. without reference measurements from outside. However, an intrinsic method would be of great importance for fault-tolerant systems. In addition, a recalibration of a position measuring system during normal operation would be very valuable in order to decisively improve the long-term stability.

SUMMARY OF THE INVENTION

The method according to the invention for determining the position of a position indicator is based on the finding that the sensor measurement values supplied by the sensors can be represented as a measurement vector, i.e. as a point in a vector space, the dimension of which corresponds to the number of sensors, and that the measurement vectors generated during the movement of the position indicator (rotation about an axis of rotation or displacement along an axis) lie on a path called orbit in this vector space.

This orbit can—under ideal conditions—be projected onto a circle or a circular arc by means of a linear mapping, i.e. each position of the position indicator corresponds to a point on the orbit in the abstract space of the signal vectors which is unambiguously assigned to a point on the circle or arc. Non-ideal conditions, for example non-ideal properties of the position indicator, which can be particularly the case with magnets, or an insufficient number of sensors or the use of non-optimally selected calibration positions, cause deviations from the circular shape. The linear mapping can be represented as a matrix-vector operation and can be determined using standard methods of linear algebra. Each measurement vector is projected onto a 2-component vector, the tip of which approximates a circular arc, wherein the direction of the 2-component vector corresponds to the position of the position indicator. The linear mapping is determined in a calibration phase, which includes the detection of measurement vectors and the decomposition of a matrix formed by the measurement vectors into two or typically three matrices. The representation of the measured values provided by the sensors as a vector also makes it possible to reduce the influence of external fields, in particular magnetic external fields, by means of a further linear mapping.

The method according to the invention can be used universally. The arrangement of the sensors is virtually arbitrary. The sensors may even detect different components of the field generated by the position indicator. The determination of the matrix can be carried out using measurements which only have to fulfill an absolute minimum of prerequisites. The method is particularly effective without a plurality of angular reference measurements, except the determination of the zero position, which however requires only a single reference measurement. These minimum requirements for the measurements needed for the calibration allow inter alia that a recalibration of the position measuring system is possible during normal operation, or that a factory-based, initial calibration for a given position measuring system can be iteratively improved by means of a bootstrapping method.

Further, in implementations which provide redundant information to the position of the position indicator (e.g., because more than the minimum number of single sensors is installed), one or more of the following additional tasks can be solved:
  error detection, i.e. intrinsically detecting a drift and triggering a predetermined action, for example, a corresponding warning or recalibration.

external field compensation by suppressing external field influences on the measuring signals.

elimination of errors caused by an offset between the actual axis of rotation of the position indicator and the ideal axis of rotation.

elimination of errors caused by irregularities of the magnet when the position indicator is a magnet.

improvement of the signal-to-noise ratio if more than two sensors are used, since then a plurality of individual sensor values enter into the determination of the position and thus an averaging takes place. In particular, difficulties during the zero crossing of the sine or cosine signal of conventional systems can be avoided.

Furthermore, the method for determining the position of a position indicator according to the invention can be designed such that a number of r=2+b sensors are used, and that a projection matrix is used to project the influence of a number of b different external field configurations out of the signal vectors, wherein the projection matrix simultaneously produces 2-component vectors whose tips lie essentially on a circle or circular arc.

BRIEF DESCRIPTION OF THE DRAWING FIGURES

The accompanying drawings, which are incorporated into and constitute a part of this specification, illustrate one or more embodiments of the present invention and, together with the detailed description, serve to explain the principles and implementations of the invention. The figures are drawn schematically and not to scale. In the drawings.

DETAILED DESCRIPTION OF THE INVENTION

Figure 1:
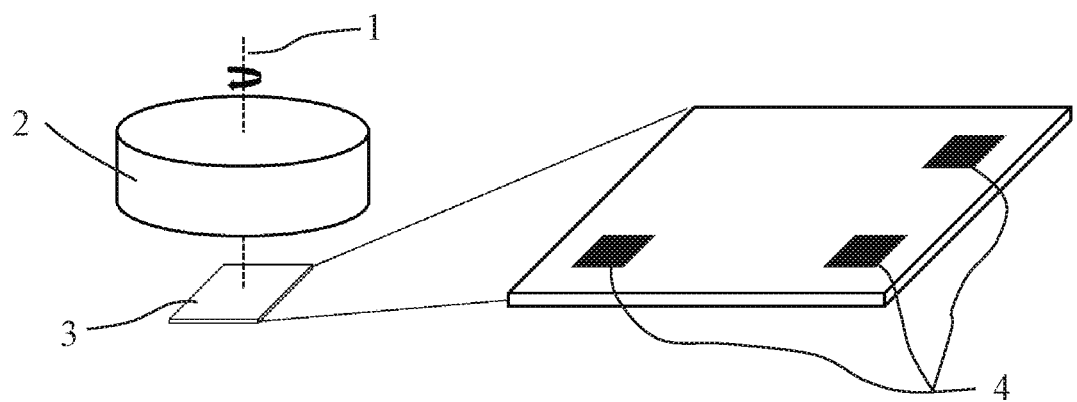
FIG. 1 shows an angle measurement system.

FIG. 1 shows a position measuring system which has a magnet 2 rotatable about a predetermined axis of rotation 1 and a sensor chip 3. The rotational position of the magnet 2 is the position $\phi$ to be determined by means of the sensor chip 3. The sensor chip 3 is shown enlarged on the right-hand side of FIG. 1. The sensor chip 3 comprises a predetermined number of 1 to r sensors 4 and electronic circuits for the operation of the sensors 4, etc. The sensors 4 are, for example, Hall sensors. Such a sensor 4 can also be a cluster of several individual sensors which provide a common output signal. The sensor chip 3 can also contain magnetic field concentrators, which amplify the magnetic field generated by the magnet 2 at the locations of the sensors 4. The number r of the sensors 4 is at least r=2. The sensors 4 each output a sensor signal. The sensor signals are designated herein as $a_1$ to $a_r$. The index j of the sensor signal $a_j$ therefore designates the number of the respective sensor 4.

Figure 2:
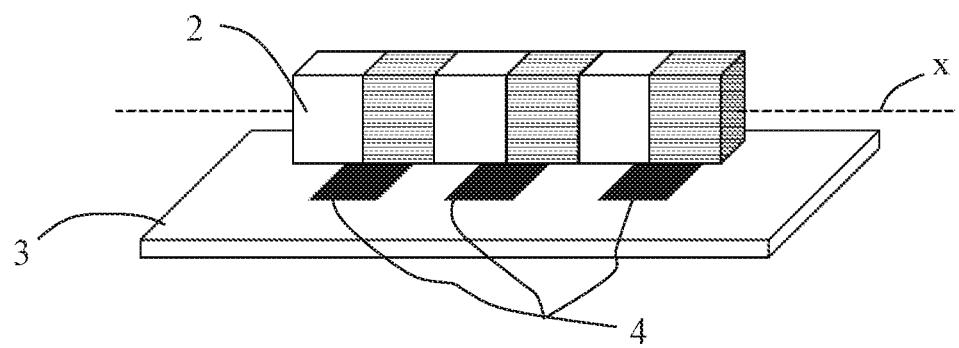
FIG. 2 shows a linear position measuring system.

FIG. 2 shows a position measuring system constituted by a magnet 2 and a sensor chip 3 which are displaceable relative to one another along a linear axis x. The sensor chip 3 comprises a predetermined number of 1 to r sensors 4 and electronic circuits for the operation of the sensors 4, etc. The sensors 4 are, for example, Hall sensors. The magnet 2 consists of alternately oppositely magnetized regions which produce a periodically changing magnetic field at the locations of the sensors 4 during a displacement along the axis x. Die x-position of the magnet 2 is the position $\phi$ to be determined by means of the sensor chip 3. It is $x=D/2\pi\cdot\phi$, wherein D is a distance defined by the magnet 2.

The sensors 4 of these position measuring systems provide, as a result of the periodically changing magnetic field, harmonic output signals. The position measuring system of FIG. 1 is an angle measuring system with the rotatable magnet 2 as a position indicator. The position measuring system of FIG. 2 is a linear measuring system with the displaceable magnet 2 as a position indicator. In both position measuring systems, the range of values of the position $\phi$ extends over a range from 0 to $2\pi$, which corresponds either to the angular range from 0 to 360° or to a linear range of 0 to D, wherein the distance D results from the fact, that for all j=1, . . . , r sensor signals $a_j$ is $a_j(x+D)=a_j(x)$.

Figure 3:
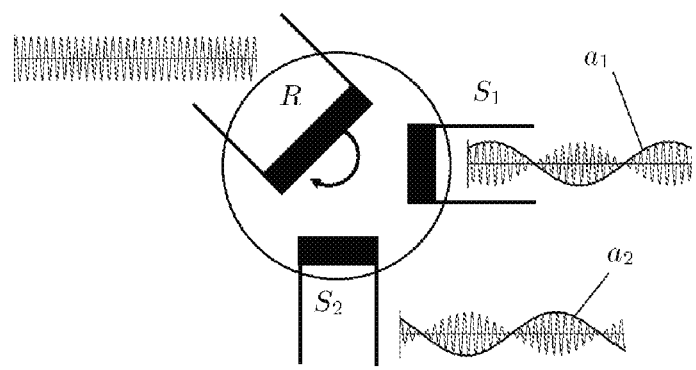
FIG. 3 shows a resolver.

FIG. 3 shows a position measuring system, which is formed from a rotor coil R and from the stator coils $S_i$, i=1, . . . , r with r≥2. The rotor coil R is rotatable about an axis of rotation and is fed with a sinusoidal current which generates a magnetic field. The magnetic field induces in the stator coils $S_i$, i=1, . . . , r a voltage whose amplitude is modulated as a function of the rotational angle r of the rotor coil R. By means of demodulation, sensor signals $a_i(t)$, i=1 . . . , r, which vary harmonically with the angle of rotation $\phi$, are generated from the stator coil signals, from which the instantaneous rotational angular position $\phi(t)$ of the rotor coil R can be calculated. The signal vector $a_i(t)$ consists of the envelope of the signal of the stator coil $S_i$ for all i=1, . . . , r.

Position measuring systems can also be based on the inductive principle, in which at least one transmitting coil and at least one receiving coil are spatially fixed, and the position indicator is a geometrically structured, electrically conductive disk which is rotatable about an axis. It is also possible to use the same coil for the transmission and the reception process. The coils can be arranged and/or connected to one another on several levels. The position measuring system can have two or more coils. The use of several coils is particularly helpful to detect the full 360° rotation. The position indicator changes the inductance of the transmitting coil and the receiving coil(s). The transmitting coils are fed with alternating currents, preferably sinusoidal currents, whereby the magnetic fields generate induction voltages in the receiving coils which because of the position-dependent eddy currents generated in the disk have harmonically varying amplitudes. By means of demodulation, the signals for the method according to the invention for determining the position of the position indicator are obtained.

The method according to the invention can also be used in optical position measuring systems in which two or more optical sensors (e.g. phototransistors, photodiodes, etc.) detect in dependence of the position of an optically active position indicator the brightness, polarization, phase shift, time of flight or other optical property variations. For this purpose, the position indicator reflects or modulates a light beam and thus causes the harmonic signals used by the method. Instead of the optical field, such a position meter can also be equipped with radar or terahertz radiation sensors, or corresponding position indicators. In addition, sound waves, in particular ultrasound can also be used instead of optical and electromagnetic waves, and a corresponding position measuring system can be constructed.

The method according to the invention can also be used in electrostatic position measuring systems in which a rotatably mounted geometrically structured electrode as position indicator together with stator electrodes forms two or more capacitors with position-dependent capacitances. Capacitive signals that vary with the position are generated and detected. In an electrostatic system, the position indicator can also be realized by a structured dielectric material which modulates the capacitance of two or more spatially fixed electrode pairs harmonically with the position.

The method according to the invention also makes it possible to separate the useful signal or the useful signals from interfering signals. An example is a magnetic rotary encoder on an electric motor. In this case, the magnetic field of the magnetic angle sensor can be separated cleanly from the rotating fields of the electric motor. Thus, the position can be determined without interference. This also applies to optical, electro-magnetic, electrical, magnetic, and acoustic position determinations.

All these physical principles can be used both for the construction of a position measuring system with a rotatably mounted position indicator as well as with a linearly displaceably mounted position indicator.

The invention relates to a method by which the position φ can be calculated from the measured values delivered by the sensors 4 in virtually any position of the sensor chip 3 relative to the axis of rotation 1 or to the linear axis x. The method may be a simple method, e.g. a method without offset correction and without external field correction, or a method with offset correction or a method with external field correction or a method with offset and external field correction. The method comprises, in all cases, a calibration phase and the normal operation.

The offset correction takes place by means of an offset vector $\vec{a}_0$. The external field correction takes place by means of a projection matrix P. The offset and external field correction takes place by means of the offset vector $\vec{a}_0$ and the projection matrix P.

The offset vector $\vec{a}_0$ and the projection matrix P are determined, if necessary, in the calibration phase. In the calibration phase, a matrix M is determined in each case.

Normal Operation

In normal operation, the position φ of the position indicator is calculated by the steps:

A) Detecting the sensor signals $a_1$ to $a_r$ of the sensors. The sensor signals $a_1$ to $a_r$ form an r-tuple $(a_1, \ldots, a_r)$, which is interpreted as a signal vector $\vec{a}=(a_1, \ldots, a_r)$ in an r-dimensional signal vector space.

B) Forming a measurement vector $\vec{q}$ according to a predetermined linear function to $\vec{q}=g(\vec{a})$.

C) Calculating a vector $\vec{p}=M\cdot\vec{q}$.

$\vec{p}=(p_1,p_2)$ is a 2-component vector with the components $p_1$ and $p_2$ and M is a 2×n matrix.

$$\vec{p} = M \cdot \vec{q} \text{ can be written as } \begin{pmatrix} p_1 \\ p_2 \end{pmatrix} = \begin{pmatrix} M_{11} & \cdots & M_{1n} \\ M_{21} & \cdots & M_{2n} \end{pmatrix} \cdot \begin{pmatrix} q_1 \\ \vdots \\ q_n \end{pmatrix},$$

D) Determining the position φ, from the components $p_1$ and $p_2$ of the vector $\vec{p}$ by means of a predetermined function $f(\vec{p})$ to $\phi=f(\vec{p})=f(p_1,p_2)$.

Preferred examples for the linear function $g(\vec{a})$ are:

1) $g(\vec{a})=\vec{a}$, i.e. $\vec{q}=\vec{a}$, if neither an offset correction nor an external field correction is performed, 2) $g(\vec{a})=\vec{a}-\vec{a}_0$, i.e. $\vec{q}=\vec{a}-\vec{a}_0$, if (only) an offset correction is performed, 3) $g(\vec{a})=P\cdot\vec{a}$, i.e. $\vec{q}=P\cdot\vec{a}$, if (only) an external field correction is performed, or 4) $g(\vec{a})=P\cdot(\vec{a}-\vec{a}_0)$, i.e. $\vec{q}=P\cdot(\vec{a}-\vec{a}_0)$, if an offset and external field correction is performed.

wherein $\vec{a}_0$ in designates an offset vector and P a projection matrix. The measurement vectors $\vec{q}$ therefore have a number, n, of components, with $2 \leq n \leq r$.

Figure 4:
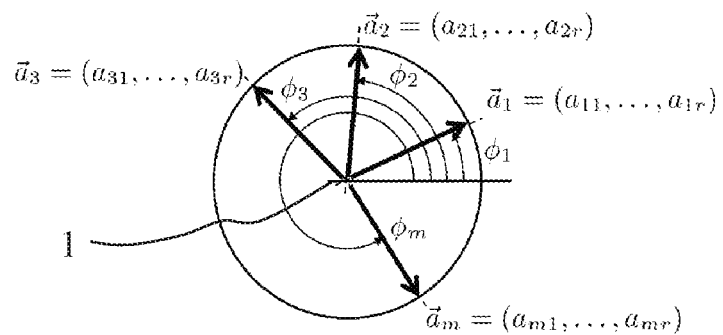
FIGS. 4 to 10 illustrate various aspects of the method according to the invention.

FIG. 4 illustrates the relationship of positions $\phi_k$ of the position indicator and the vectors $\vec{a}_k$, which are formed from the signals of the r sensors, for k=1, 2 to m. The positions $\phi_k$, which lie in the range from 0 to $2\pi$, are shown here as angles, as it is the case with an angle measuring system. However, the positions $\phi_k$ of the position indicator can also lie on a linear axis. The arrows illustrate the positions $\phi_k$ of the position indicator, a signal vector $\vec{a}_k$ is assigned to each position $\phi_k$.

Figure 5:
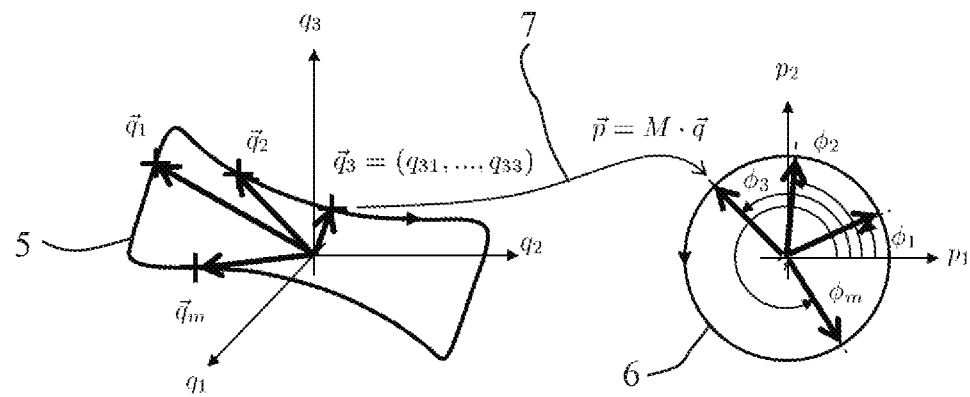

FIG. 5 illustrates for the example n=3 the linear mapping $\vec{p}=M\cdot\vec{q}$, which maps the measurement vectors $\vec{q}$, which lie on an orbit 5 in a n-dimensional vector space, by means of the matrix M on 2-component vectors $\vec{p}$, the tips of which lie on a circle 6. The left side illustrates the space of the measurement vectors $\vec{q}$, the right side shows the plane with the circle 6 and the 2-component vectors $\vec{p}$. By way of example, the mapping from $\vec{q}_3$ on $\vec{p}_3$ is indicated by an arrow. A vector $\vec{p}_k$ is assigned to each measurement vector $\vec{q}_k$. The direction of the vector $\vec{p}_k$ includes an angle with a reference direction which corresponds to the position $\phi_k$ of the position indicator.

Temperature Compensation

The sensor signals may be temperature-dependent. The temperature dependence can be compensated in different ways, for example, in that the temperature is measured and the sensor signals as well as the sensor offsets are temperature-compensated. Alternatively, the above process can be carried out at various temperatures and the relevant quantities, in particular the matrix M, can be a temperature-dependent matrix. The matrix M is determined in this case, for example, for a predetermined number of temperature support points and the temperature compensation is effected as follows:

1. Detecting the temperature and interpolating the matrix M for the measured temperature from the matrices M at the support points.
2. Applying the interpolated matrix M to the actual measurement vectors.

If an offset compensation and/or an external field compensation is carried out, also the offset vector $\vec{a}_0$ and given the case the projection matrix P are determined in the same way by interpolation of the corresponding objects at the temperature support points.

This variant offers the advantage that in this way both temperature effects which influence the mechanical position of the position indicator relative to the sensor chip as well as temperature-dependent effects in the sensors can be compensated for.

The vector $\vec{p}$ contains the complete information about the position φ to be determined. For many applications, the relationship between the vector $\vec{p}$ and the position φ is given by the equations $p_1=\cos(\phi)$ and $p_2=\sin(\phi)$. The predetermined function $f(\vec{p}) = f(p_1, p_2)$ is a function, which is based on the equations $p_1 = \cos(\phi)$ and $p_2 = \sin(\phi)$. It is, in particular, a function, which determines the position $\phi$ on the basis of the equation $\phi = $ aucustangens$(p_2/p_1)$ and the signs of the values $p_1$ and $p_2$. The function $f(\vec{p})$ is for example the function $f(\vec{p}) = $ a tan $2(p_2, p_1)$, wherein a tan $2(p_2, p_1)$ is a function known from many programming languages which provides the correct angle in the range of 0 to $2\pi$.

Calibration Phase

Since the offset vector influences the determination of the projection matrix P as well as the determination of the matrix M, and the projection matrix P influences the determination of the matrix M, the following sequence must be observed in the calibration phase:

1. Determination of the offset vector $\vec{a}_0$, if an offset correction is desired,
2. Determination of the projection matrix P, if a correction of external fields is desired,
3. Determination of the matrix M.

These steps are subsequently explained in detail.

Determination of the Offset Vector

The offset vector $\vec{a}_0$ can be determined in a conventional, known manner. In doing so, the offset of each of the sensors $a_{0j}$ with j=1 to r is determined and the entirety of the offsets is stored as offset vector $\vec{a}_0 = (a_{01}, \ldots, a_{0r})$.

The offset vector $\vec{a}_0$ can also be determined from the signal vectors, if the positions belonging to the signal vectors are equidistributed. This occurs by:

1. Forming the mean values $\bar{a}_1$ to $\bar{a}_r$ of the single sensor signals according to $\bar{a}_i = 1/m \Sigma_{k=1}^{m} a_{kl}$.
2. Forming the offset vector $\vec{a}_0 = (\bar{a}_1, \ldots, \bar{a}_r)$.

Determination of the Projection Matrix P

The signal vector $\vec{a} = (a_1, \ldots, a_r)$, which form the orbit, are generally located in a subspace of the entire r-dimensional vector space of the r-tuples. Influences of external fields can be eliminated in this case by the application of a projection matrix P. The determination of the projection matrix P occurs, preferably in absence of the position indicator, with the following steps. However, it can also be performed in presence of the position indicator.

1. In absence of the position indicator step 1 comprises the substeps 1.1 to 1.2, which are executed for a predetermined number of different external fields v=1 to b≥1, wherein the number b fulfills the condition b≤r-2.
   1.1 Applying the external field.
      The external field is for example a homogeneous magnetic field, which points in an arbitrary space direction. The external field can also be an inhomogeneous external field, to which the position measuring system is exposed. In order to eliminate the influence of external fields, additional sensors 4 are required. The minimum number of sensors 4, which is necessary to eliminate a number of b different external fields, is according to the above equation r=b+2.
   1.2 Detecting the sensor signals $a_1$ to $a_r$ and forming an external field vector $\vec{f}_v = \vec{a} = (a_1, \ldots, a_r)$
   or given the case of an offset compensated external field vector, respectively, $\vec{f}_v = \vec{a} - \vec{a}_0$.
or
1. In presence of the position indicator step 1 comprises the substeps 1.1 to 1.3:

1.1 Moving the position indicator in a fixed position.
   1.2 Detecting the sensor signals $a_1$ to $a_r$ and storing as vector $\vec{a}_F$.
   1.3 Executing the following steps for a predetermined number v=1 to b≥1 of different external fields, wherein the number b fulfills the condition b≤r-2:
      1.3.1 Applying the external field.
         The external field is for example a homogeneous magnetic field, which points in an arbitrary space direction. The external field can also be an inhomogeneous external field, to which the position measuring system is exposed. In order to eliminate the influence of external fields, additional sensors 4 are required. The minimum number of sensors 4, which is necessary to eliminate a number of b different external fields, is according to the above equation r=b+2.
      1.3.2 Detecting the sensor signals $a_1$ to $a_r$ and forming an external field vector $\vec{f}_v = \vec{a} - \vec{a}_F$
      or given the case of an offset compensated external field vector, respectively, $\vec{f}_v = \vec{a} - \vec{a}_F - \vec{a}_0$.
      In the external field vector $\vec{f}_v$, the proportion of the sensor signals generated by the position indicator is thus eliminated.

Afterwards, the steps according to variant 1 or 2 follow:

In variant 1, the dimension of the vector space of the measurement vectors is reduced. Variant 1 comprises the steps:

2. Forming a complete, orthonormal basis of the measurement vector space with the steps
   2.1 Forming of c orthonormal vectors $\vec{g}_1, \ldots, \vec{g}_c$ of the vector space spanned by the external field vectors $\vec{f}_1, \ldots, \vec{f}_b$, wherein c≤b. Thus, for these basis vectors is $\vec{g}_i \cdot \vec{g}_j = 0$ i≠j and $\vec{g}_i \cdot \vec{g}_i = 1$ for i=1, \ldots, c.
      The orthonormal basis of the vectors $\vec{g}_1, \ldots, \vec{g}_c$ can for example be calculated with the Gram-Schmidt-orthogonalisation method, which is a standard method of linear algebra and which orthonormalizes the external field vectors $\vec{f}_1, \ldots, \vec{f}_b$ step-by-step.
   2.2 Complementing the c vectors $\vec{g}_1, \ldots, \vec{g}_c$ with n=r-c further vectors $\vec{g}_{c+1}, \ldots, \vec{g}_{c+n}$ to a complete, orthonormal basis of the r-dimensional vector space of the signal vectors. Thus, for these basis vectors is $\vec{g}_i \cdot \vec{g}_j = 0$ for i≠j and $\vec{g}_i \cdot \vec{g}_i = 1$ for i=1, \ldots, r.
3. Forming the projection matrix P according to $$P = \begin{pmatrix} \vec{g}_{c+1} \\ \vdots \\ \vec{g}_{c+n} \end{pmatrix} = \begin{pmatrix} g_{c+1,1} & \cdots & g_{c+1,r} \\ \vdots & & \vdots \\ g_{c+n,1} & \cdots & g_{c+n,r} \end{pmatrix}$$

The n basis vectors $\vec{g}_{c+1}, \ldots, \vec{g}_{c+n}$ form the rows of the n×r matrix P. The application of P to a signal vector $\vec{a}$ delivers a n-dimensional vector $\vec{q} = P\vec{a}$ with respect to the new basis $\vec{g}_{c+k}$, k=1, \ldots, n, which contains no portions of external field vectors. In this case, when calculating the measurement vectors the dimension r of the vector space of the signal vectors is reduced by the value c, so that the space of the measurement vectors has the dimension n=r−c.

In variant 2, the dimension of the vector space of the measurement vectors is not reduced compared to the dimension of the vector space of the signal vectors. The variant 2 comprises the steps:

2. Forming an orthonormal basis of c vectors $\vec{g}_1, \ldots, \vec{g}_c$ of the vector space spanned by the external field vectors $\vec{f}_1, \ldots, \vec{f}_b$, wherein c≤b. Therefore, for these basis vectors it is $\vec{g}_i \cdot \vec{g}_j = 0$ for i≠j and $\vec{g}_i \cdot \vec{g}_i = 1$ for i=1, ..., c.

The orthonormal basis of the vectors $\vec{g}_1, \ldots, \vec{g}_c$ can for example be calculated with the Gram-Schmidt-orthogonalisation method, which is a standard method of linear algebra and which orthonormalizes the external field vectors $\vec{f}_1, \ldots, \vec{f}_b$ step-by-step.

3. Forming the projection matrix P according to $$P = \mathbb{1} - \sum_{i=1}^{c} \vec{g}_i \otimes \vec{g}_i,$$

wherein $\vec{g}_i \otimes \vec{g}_i$ are the tensor products of the vectors $\vec{g}_i$, i.e. are the r×r matrices $$\vec{g}_i \otimes \vec{g}_i = \begin{pmatrix} g_{i1}g_{i1} & \cdots & g_{i1}g_{ir} \\ \vdots & & \vdots \\ g_{ir}g_{i1} & \cdots & g_{ir}g_{ir} \end{pmatrix}.$$

The equation $P = \mathbb{1} - \sum_{i=1}^{c} \vec{g}_i \otimes \vec{g}_i$ reads written in full:

$$\begin{pmatrix} P_{11} & \cdots & P_{1r} \\ \vdots & & \vdots \\ P_{r1} & \cdots & P_{rr} \end{pmatrix} = \begin{pmatrix} 1 & & \\ & \ddots & \\ & & 1 \end{pmatrix} - \begin{pmatrix} g_{11}g_{11} & \cdots & g_{11}g_{1r} \\ \vdots & & \vdots \\ g_{1r}g_{11} & \cdots & g_{1r}g_{1r} \end{pmatrix} - \ldots - \begin{pmatrix} g_{c1}g_{c1} & \cdots & g_{c1}g_{cr} \\ \vdots & & \vdots \\ g_{cr}g_{c1} & \cdots & g_{cr}g_{cr} \end{pmatrix}$$

The application of the protection matrix P on a signal vector $\vec{a}$ delivers an r-dimensional vektor $\vec{q} = P\vec{a}$ with respect to the standard base of the measurement vector space, wherein the vector $\vec{q}$ is orthogonal to the subspace of the external field vectors. The dimension of the vector space of the measurement vector $\vec{q}$ is equal to the dimension of the vector space of the signal vectors $\vec{a}$. Therefore, the projection matrix P is a r×r matrix.

Determination of the Matrix M

The determination of the matrix M occurs in a calibration phase. For this, two methods are explained in the following. The first method is based on the condition that it is ensured "from outside" that calibration positions are selected, which are distributed over the whole measurement range and enable a precise result. The second method is a bootstrap-process, which is started with a factory setting and then iteratively produces better calibration positions.

Method 1

The determination of the matrix M occurs with the following steps:

1. Detecting the sensor signals $a_{k1}$ to $a_{kr}$ of the r sensors 4 for a predetermined number of k=1 to m positions of the position indicator, wherein m≥3.

This step delivers in signal vectors $\vec{a}_1, \ldots, \vec{a}_m$ with $\vec{a}_k = (a_{k1}, \ldots, a_{kr})$, k=1 to m.

2. Forming nm measurement vectors $\vec{q}_k$ with k=1 to m according to the predetermined function g to $\vec{g}_k = \vec{g}(\vec{a}_k)$, 3. Forming a matrix Q according to $$Q = \begin{pmatrix} \vec{q}_1 \\ \vdots \\ \vec{q}_m \end{pmatrix} = \begin{pmatrix} q_{11} & \cdots & q_{1n} \\ \vdots & & \vdots \\ q_{m1} & \cdots & q_{mn} \end{pmatrix}.$$

The m measurement vectors $\vec{q}_1, \ldots, \vec{q}_m$ form the rows of the matrix Q. The matrix Q is a m×n matrix, wherein the number n of its columns depends on the predetermined function g. It is n≤r. As explained further above, a reduction to n<r can occur, for example, during the elimination of external field influences.

The determination of the matrix M from the matrix Q occurs in such a way that the transformation $\vec{p} = M \cdot \vec{q}$ is a linear mapping, which maps each of the m measurement vectors $\vec{q}_k$ on a 2-component vector $\vec{p}_k$, wherein the tips of the vectors $\vec{p}_k$ substantially lie on a circle or on a circular arc. "Substantially" means in ideal circumstances really, in practice, however, usually only approximately, i.e. the tips $\vec{p}_k$ of the vectors are then distributed on both sides of the circle line. The circle can therefore be a dented circle, with bumps inside and outside. Because the transformation $\vec{p} = M \cdot \vec{q}$ is a linear mapping, the matrix M can be determined with methods of linear algebra, wherein these methods include a decomposition of the matrix Q in two or three matrices. The determination of the matrix M requires no statistical methods as for example regression analysis or fits. The determination of the matrix M from the matrix Q comprises the following steps 4 to 9:

4. Determining three matrices U, S and $V^T$, which fulfill the equations $Q = U \cdot S \cdot V^T$, wherein U and V are orthogonal matrices, i.e. fulfill the equations $$U^T \cdot U = \mathbb{1}$$

$$V^T \cdot V = \mathbb{1}, \text{ and}$$

S is a positive semidefinite m×n diagonal matrix. $U^T$ and $V^T$ are the transposed matrices of the matrices U and V, respectively. $\mathbb{1}$ designates the unit matrix. The equation $Q = U \cdot S \cdot V^T$ reads written in full:

$$\begin{pmatrix} q_{11} & \cdots & q_{1n} \\ \vdots & & \vdots \\ q_{m1} & \cdots & q_{mn} \end{pmatrix} =$$

-continued $$\begin{pmatrix} U_{11} & \cdots & U_{1m} \\ \vdots & & \vdots \\ U_{m1} & \cdots & U_{mm} \end{pmatrix} \cdot \begin{pmatrix} s_1 & & & 0 & \cdots & 0 \\ & \ddots & & \vdots & & \vdots \\ & & s_l & 0 & \cdots & 0 \\ 0 & \cdots & 0 & 0 & \cdots & 0 \\ \vdots & & \vdots & \vdots & & \vdots \\ 0 & \cdots & 0 & 0 & \cdots & 0 \end{pmatrix} \cdot \begin{pmatrix} V_{11}^T & \cdots & V_{1n}^T \\ \vdots & & \vdots \\ V_{n1}^T & \cdots & V_{nn}^T \end{pmatrix}$$

The matrix U is a m×m matrix, the matrix V is a n×n matrix. The values $s_1$ to $s_l$, $l \leq \min(m,n)$ of the diagonal values of the matrix S are called singular values of the matrix i.e. $s_j \geq 0$ for $j=1, \ldots, l \leq \min(m,n)$. ($V_{jk}^T$ designates the jk-element of the transposed matrix $V^T$)

The determination of the matrix M does not require all, but only selected and non-zero elements of the diagonal matrix S, as well as elements of the matrices V and U linked to these. The matrices U, S and V are therefore advantageously calculated with the aid of the singular value decomposition (SVD), a standard operation of linear algebra, because the singular value decomposition sorts the elements of the diagonal matrix S according to their size, so that $s_1 \geq s_2 \geq \ldots \geq s_l$. The singular value decomposition delivers the matrix V, the matrix $V^T$ is obtained by transposition.

The determination of the matrix M is performed as a function of an integer parameter h, which must fulfill the condition $2 \leq h \leq l$. The accuracy of the matrix M is the higher, the higher the value of the parameter h is.

5. Forming sub-matrices $\tilde{U}$, $\tilde{S}$ and $\tilde{V}^T$, wherein
   $\tilde{U}$ is that m×h sub-matrix of the m×m matrix U, which is formed by discarding the columns h+1 to m,
   $\tilde{S}$ is that h×h sub-matrix of the m×n matrix S, which is formed by discarding the rows h+1 to m and discarding the columns h+1 to n, and
   $\tilde{V}^T$ is that h×n sub-matrix of the n×n matrix $V^T$, which is formed by discarding the rows h+1 to n.

6. Forming a 2×m auxiliary matrix W:
   If the measurement vectors are present in an arbitrary order, then the auxiliary matrix W is formed according to variant 1. If the measurement vectors $\vec{q}_k$ with $k=1, \ldots, m$ are sorted in ascending or descending order according to their associated position $\phi_k$, then the auxiliary matrix W is formed according to variant 2.

Variant 1 comprises the sub steps:
   6.1 For i=1 to m calculating $\alpha_i = \text{atan } 2(U_{12}U_{i1} - U_{11}U_{i2}, U_{12}U_{i2} + U_{11}U_{i1})$.
   6.2 Calculating the permutation k(i), which sorts the $\alpha_i$-values according to their size, so that $\alpha_{k(i)} > \alpha_{k(i-1)}$ for $i=2, \ldots, m$.
   6.3 Forming the auxiliary matrix W according to $$W_{i,k(j)} = \begin{cases} \sin\left(\frac{2\pi(j-1)}{m}\right), & i=1 \\ \cos\left(\frac{2\pi(j-1)}{m}\right), & i=2 \end{cases}, \text{ for } j=1 \text{ to } m,$$

wherein $W_{i,k(j)}$ designates the i,k(j)-element of the matrix W, i.e. in the column k(j) given by the previously determined permutation of the indices is the entry for the index j. In other words, the columns of the matrix W are sorted depending on the order of the measurement vectors.

Variant 2 comprises the single step depending on the auxiliary parameter $f=1$ for ascending and $f=-1$ for descending order according to the associated position $\phi_k$.

6.1 Forming the auxiliary matrix W according to $$W_{ij} = \begin{cases} \sin\left(f \cdot \frac{2\pi(j-1)}{m}\right), & i=1 \\ \cos\left(f \cdot \frac{2\pi(j-1)}{m}\right), & i=2 \end{cases}, \text{ for } j=1$$

to m

7. Calculating a 2×h auxiliary matrix T according to $T = W\tilde{U}$
   This equation reads written in full:

$$\begin{pmatrix} T_{11} & \cdots & T_{1h} \\ T_{21} & \cdots & T_{2h} \end{pmatrix} = \begin{pmatrix} W_{11} & \cdots & W_{1m} \\ W_{21} & \cdots & W_{2m} \end{pmatrix} \cdot \begin{pmatrix} U_{11} & \cdots & U_{1h} \\ \vdots & & \vdots \\ U_{m1} & \cdots & U_{mh} \end{pmatrix}$$

8. Forming a 2×n auxiliary matrix H
   The auxiliary matrix H is formed from the auxiliary matrix T and the sub-matrices $\tilde{S}$ and $\tilde{V}^T$ according to $H = T\tilde{S}^{-1}\tilde{V}^T$. This equation reads written in full:

$$\begin{pmatrix} H_{11} & \cdots & H_{1n} \\ H_{21} & \cdots & H_{2n} \end{pmatrix} = \begin{pmatrix} T_{11} & \cdots & T_{1h} \\ T_{21} & \cdots & T_{2h} \end{pmatrix} \cdot \begin{pmatrix} \frac{1}{s_1} & & \\ & \ddots & \\ & & \frac{1}{s_h} \end{pmatrix} \cdot \begin{pmatrix} V_{11}^T & \cdots & V_{1n}^T \\ \vdots & & \vdots \\ V_{h1}^T & \cdots & V_{hn}^T \end{pmatrix}$$

9. Forming the matrix M
   With the calculation of the auxiliary matrix H all steps for forming the matrix M are completed, with the exception of a single step, which, however, is not required in all cases. This step concerns the determination or check of the movement direction. In an angle sensor, the movement direction corresponds to the sense of rotation. Note the following:
   If in normal operation only the absolute value $|\phi_1 - \phi_2|$ of the difference of two measured positions $\phi_1$ and $\phi_2$ is important, then it is M=H.
   If in normal operation also the movement direction, i.e. the sign of the difference $\phi_1 - \phi_2$ is important, then it is M=NH, where $$N = \begin{pmatrix} d & 0 \\ 0 & 1 \end{pmatrix}$$

is an auxiliary matrix, whose parameter d has the value $d=1$ or $d=-1$.
   If the measurement vectors are sorted according to ascending or descending positions, it is $d=1$, or $N = \mathbb{I}$, respectively ($\mathbb{I}$ denotes the unit matrix) and therefore M=H. The correct movement direction results here therefrom, that the distinction between ascending and descending positions enters into the calculation of the auxiliary matrix W by the parameter $f$. Therefore, the auxiliary matrix W contains the information on the movement direction.

If the measurement vectors are not sorted according to ascending or descending positions, but are provided in an arbitrary order, then the movement direction can be determined by a measurement with the substeps 9.1 to 9.4:

9.1 Bringing the position indicator in a first predetermined set-position $\psi_1$, detecting the sensor signals and forming the corresponding measurement vector, and calculating the corresponding actual position $\phi_1$, and bringing the position indicator in a second predetermined set-position $\psi_2$, detecting the sensor signals and forming the corresponding measurement vector, and calculating the corresponding actual position $\phi_2$, wherein each time the calculation occurs with the steps C and D of the normal operation, with use of the matrix M=H.

9.2 Calculating the difference $\psi_1-\psi_2$, 9.3 Calculating the difference $\phi_1-\phi_2$, and 9.4 Setting the parameter d=+1 if the sign of the difference $\phi_1-\phi_2$ equals the sign of the difference $\psi_1-\psi_2$, and d=−1 otherwise.

The formation of the matrix M can formally always be written as a M=NH, because the auxiliary matrix N can be the unit matrix $\mathbb{I}$. The movement direction or the parameter d characterizing it can also always be determined by a measurement with the substeps 9.1 to 9.4. The auxiliary matrix N leaves the movement direction as it is or reverses it.

Special Cases

The described method can also be used with minor modifications in the following special cases:

1. Angle measuring system for a predetermined angular range

The positions are in a limited interval $\phi \in [\phi_{min}, \phi_{max}]$ instead of $\phi \in [0, 2\pi]$. (For a linear position meter, this corresponds to the use of only a fraction of the full period distance D).

When the measurement vectors are disordered, the elements of the auxiliary matrix W are calculated according to $$W_{i,k(j)} = \begin{cases} \sin\left(\frac{(\phi_{max}-\phi_{min})(j-1)}{m}\right), i=1 \\ \cos\left(\frac{(\phi_{max}-\phi_{min})(j-1)}{m}\right), i=2 \end{cases}, \text{ for } j=1 \text{ to } m,$$

wherein $\phi_{min}$ and $\phi_{max}$ denote the lower or upper limit of the angular range used, and k(j) represents the permutation, which orders the measurement vectors $\vec{q}_j$ in ascending or descending order according to their position, and when the measurement vectors are ordered depending on the auxiliary quantity $f=1$ for ascending and $f=-1$ for descending order according to $$W_{ij} = \begin{cases} \sin\left(f \cdot \frac{(\phi_{max}-\phi_{min})(j-1)}{m}\right), i=1 \\ \cos\left(f \cdot \frac{(\phi_{max}-\phi_{min})(j-1)}{m}\right), i=2 \end{cases}, \text{ for } j=1 \text{ to } m.$$

2. Angle measurement system with a position indicator which has a multipole character The position sensor can have a multipole character, in particular if the position indicator is a magnet, but also when the position indicator has coils. The multipole character of the magnet or of the coils is characterized by a parameter, e, which indicates the number of repetitions of the field distribution during a complete rotation of the position indicator. For a magnet with a dipolar field it is e=1, while for a quadrupole field it is e=2.

The elements of the auxiliary matrix W are calculated in the case of ordered measurement vectors as a function of the auxiliary quantity $f=1$ for ascending and $f=-1$ for descending order according to $$W_{ij} = \begin{cases} \sin\left(fe \cdot \frac{(\phi_{max}-\phi_{min})(j-1)}{m}\right), i=1 \\ \cos\left(fe \cdot \frac{(\phi_{max}-\phi_{min})(j-1)}{m}\right), i=2 \end{cases}, \text{ for } j=1 \text{ to } m,$$

and for disordered measurement vectors according to $$W_{i,k(j)} = \begin{cases} \sin\left(e \cdot \frac{(\phi_{max}-\phi_{min})(j-1)}{m}\right), i=1 \\ \cos\left(e \cdot \frac{(\phi_{max}-\phi_{min})(j-1)}{m}\right), i=2 \end{cases}, \text{ for } j=1 \text{ to } m,$$

The calculation of the position $\phi$ from the 2-component vector $\vec{p}$ occurs in this case according to $$\phi = \frac{f(\vec{p})}{e} = \frac{f(p_1, p_2)}{e}.$$

Determination of the Matrix M in the Case n=2

The determination of the matrix M for n=2 can be done in three different ways, namely according to the general method with the previously described steps 1-9, or in a simplified manner according to one of the following two methods:

Method 1 comprises:
the steps 1 to 5 of the general method,
forming an auxiliary matrix H as $H=\tilde{S}^{-1}\tilde{V}^T$, and
forming the matrix M according to variant 1 or variant 2:

Variant 1

If in normal operation only the absolute value $|\phi_1-\phi_2|$ of the difference of two measured positions $\phi_1$ and $\phi_2$ is important, then it is M=H Variant 2

If in normal operation also the movement direction, i.e. the sign of the difference $\phi_1-\phi_2$ is important, then it is M=NH.

If the measurement vectors are sorted according to ascending or descending positions, the parameter d can be calculated with the auxiliary quantity $f=1$ for ascending or $f=-1$ for descending order and from selected elements of the matrix U to $$d = f \cdot \frac{U_{12}U_{21}-U_{11}U_{22}}{|U_{12}U_{21}-U_{11}U_{22}|}.$$

If the measurement vectors are not sorted according to ascending or descending positions but are in any order, then the parameter d can be determined by the above-described measurement with the substeps 9.1 to 9.4.

With method 1 there is no need to determine the auxiliary matrices W and T.

Method 2 comprises the steps 1 to 3 of the general method. This delivers the m×2 Matrix Q. The steps 4 to 8 of the general method are replaced by the following two steps 4 and 5:

4. Determining two matrices U and B, which fulfill the equation Q=U·B, wherein U is a m×2 matrix with $U^T \cdot U = \mathbb{I}$, and B is a symmetrical, positive definite 2×2 matrix. The equation Q=U·B reads written in full:

$$\begin{pmatrix} q_{11} & \cdots & q_{12} \\ \vdots & & \vdots \\ q_{m1} & \cdots & q_{m2} \end{pmatrix} = \begin{pmatrix} U_{11} & \cdots & U_{12} \\ \vdots & & \vdots \\ U_{m1} & \cdots & U_{m2} \end{pmatrix} \cdot \begin{pmatrix} B_{11} & B_{12} \\ B_{21} & B_{22} \end{pmatrix}$$

The matrix B may be calculated by the substeps:
4.1 Forming a symmetrical, positive definite 2×2 auxiliary matrix D to $D = Q^T \cdot Q$,
4.2 Calculating the matrix B as square root according to $B = D^{1/2}$. The calculation of the square root of a matrix is a standard procedure of linear algebra.
The matrix U results to $U = QB^{-1}$, wherein the matrix U is necessary, however, at most for the calculation of the movement direction.
5. Forming an auxiliary matrix H according to $H = B^{-1}$.

This is followed by step 9 of the general method, with the modification described below, when the measurement vectors are arranged in ascending or descending order according to their positions. Because this method does not calculate the auxiliary matrix W, the correct movement direction does not enter automatically. However, it can be calculated with the auxiliary quantity $f = 1$ for ascending or $f = -1$ for descending order and from selected elements of the matrix U to:

$$d = f \cdot \frac{U_{12}U_{21} - U_{11}U_{22}}{|U_{12}U_{21} - U_{11}U_{22}|}.$$

Absolute Positions

If, in normal operation, absolute positions are also to be determined, a determination of the zero position is necessary, for example by the following steps:
positioning the position indicator in the zero position,
determining the position $\phi_0$ with the steps A to D of the normal operation, and
changing the function $f(\vec{p})$ to $f(\vec{p}) = f(\vec{p}) - \phi_0$.

Figure 6:
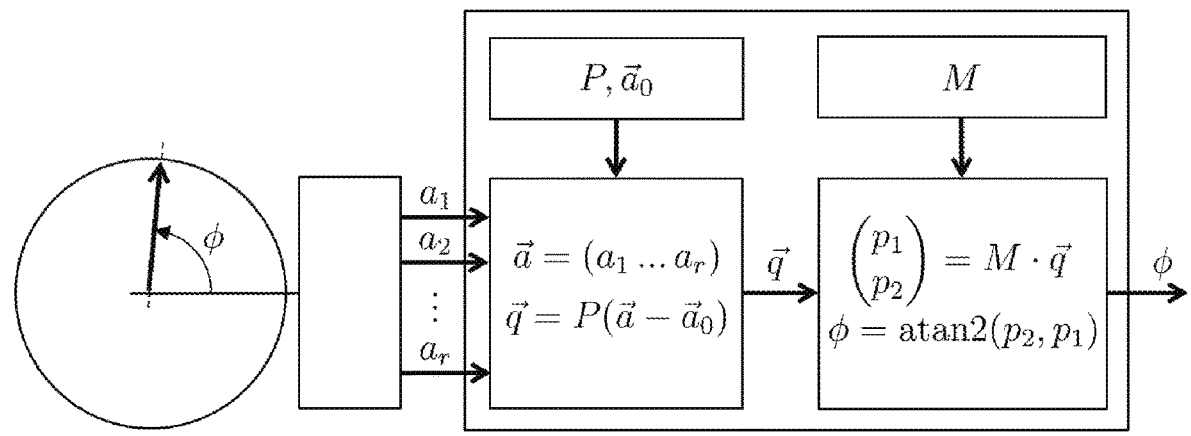
Figure 7:
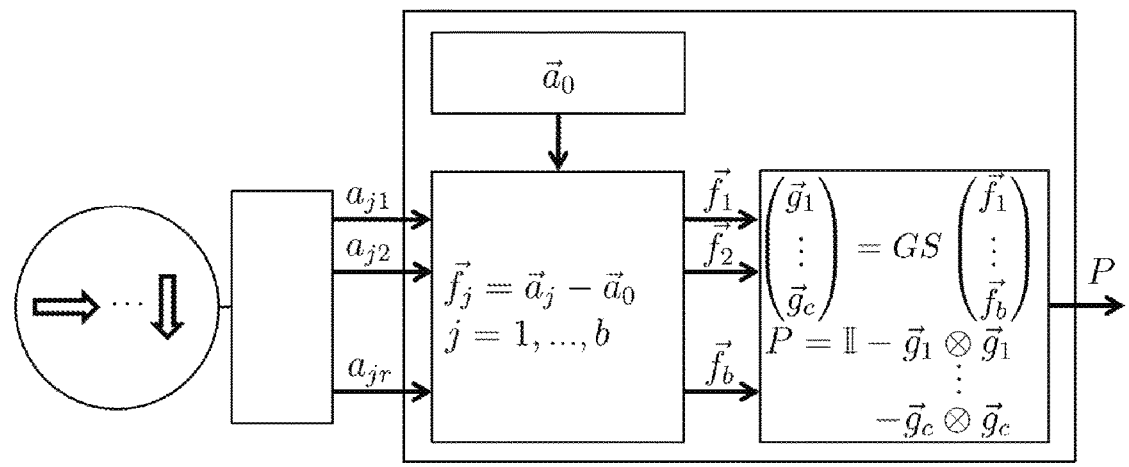
Figure 8:
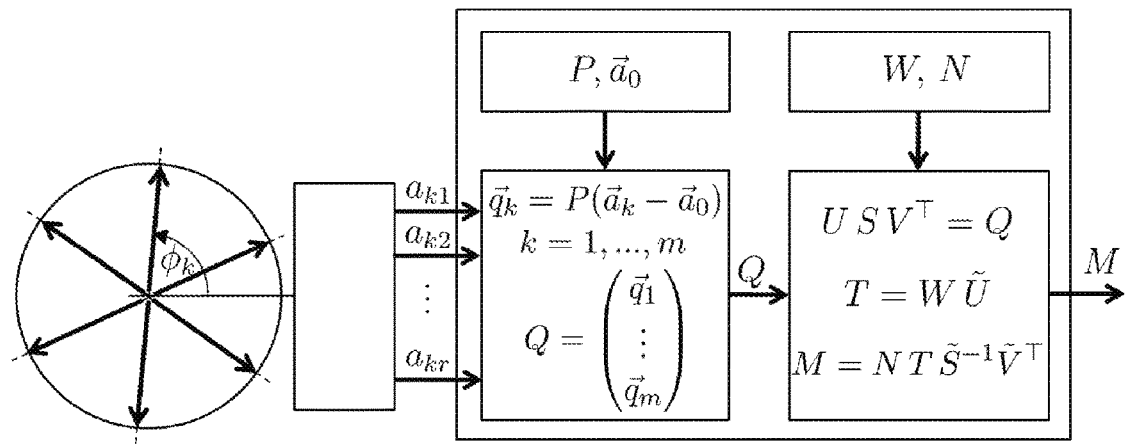

FIGS. 6 to 8 illustrate the described method steps. On the left side of the FIGS. 6 to 8 and also in FIGS. 9 and 10 explained further below, the position measuring system is represented symbolically. In detail:

FIG. 6 illustrates the normal operation of the position measuring system. The position indicator is in a position $\phi$ and generates the sensor signals $a_1, \ldots, a_r$ in the sensors 4. These signals are offset compensated by the offset vector $\vec{a}_0$ and external field compensated by the projection matrix P (each optionally), which delivers the measurement vector $\vec{q}$.

Subsequently, the 2-component vector $\vec{p}$ is calculated by multiplying the matrix M with the measurement vector $\vec{q}$. Finally from the components of $\vec{p}$ the position $\phi$ is calculated according to $\phi = a \tan 2(p_2, p_1)$, or according to another function.

FIG. 7 illustrates the determination of the projection matrix P in the calibration phase. For doing so, b external fields are applied to the position measuring system, which deliver the signal vectors $\vec{a}_j = (a_{j1}, \ldots, a_{jr})$ j=1, \ldots, b for the external fields. From the signal vectors $\vec{a}_j$, optionally, offset compensated external field vectors $\vec{f}_j$ are formed. From this, the orthonormal basis $\vec{g}_1, \ldots, \vec{g}_c$ of the subspace spanned by the external field vectors is formed, for example by the Gram-Schmidt method GS.

The projection matrix P is calculated from the basis vectors $\vec{g}_j$, in that the matrices $\vec{g}_j \otimes \vec{g}_j$ obtained as tensor products from the basis vectors are subtracted from the unit matrix.

FIG. 8 illustrates the determination of the matrix M in the calibration phase. For this, the signal vectors $\vec{a}_k = (a_{k1}, \ldots, a_{kr})$, k=1, \ldots, m are compensated with the offset vector $\vec{a}_0$ and the projection matrix P (each optionally). The resulting measurement vectors $\vec{q}_k$ form the rows of the matrix Q. The matrix Q is then decomposed into the three matrices $\tilde{U}$, $\tilde{S}$ and $\tilde{V}^T$. Depending on the predetermined parameter h, the sub-matrices $\tilde{U}$, $\tilde{V}^T$ and $\tilde{S}$ are determined from U, V and S. The matrix M is then calculated with the auxiliary matrices T and N. For this purpose, the matrix $T = W\tilde{U}$ is formed from the auxiliary matrices W and $\tilde{U}$.

Method 2: Bootstrap Method

The determination of the matrix M can also take place by means of a bootstrap method. The bootstrap process includes an initialization on the manufacturer's side, as well as a measurement data acquisition during commissioning and an iterative process for increasing the accuracy of the matrix M.

The bootstrap method comprises the following steps:
1. Setting an index i=0 and configuring a predetermined initial matrix $M^{(0)}$.
   The initial matrix $M^{(0)}$ is a manufacturer-side initialization of the matrix $M = M^{(0)}$, so that—possibly inaccurate—position calculations can be carried out with the position measuring system.
2. Detecting and storing a plurality of measurement vectors $\vec{q}$ according to the steps A and B of the normal operation.
3. Iterative determination of matrices $M^{(i)}$ (with i>0) by repeatedly performing the following steps:
   3.1. setting the matrix M to $M = M^{(i)}$
   3.2. increasing the index i by 1
   3.3. calculating the positions $\phi$ of the stored measurement vectors $\vec{q}$ according to the steps C and D of the normal operation,
   3.4. selecting a number of k=1 to nm of the stored measurement vectors $\vec{q}_k$, the corresponding positions $\phi_k$ of which fulfill a predetermined criterion,
   3.5. forming a matrix Q according to $$Q = \begin{pmatrix} \vec{q}_1 \\ \vdots \\ \vec{q}_m \end{pmatrix}$$

3.6. determining a new matrix $M^{(i)}$ from the matrix Q in such a way, that the transformation $\vec{q}'=M\cdot\vec{q}$ is a linear mapping, which maps each of the m selected measurement vectors $\vec{q}_k$ on a 2-component vector $\vec{p}_k$, until the matrix $M^{(i)}$ within a predetermined tolerance no longer differs from the matrix $M^{(i-1)}$ of the previous iteration, wherein the tips of the vectors $\vec{p}_k$ with increasing index i substantially come to lie on a circle 6 or on a circular arc. This terminates the bootstrap process (either with $M=M^{(i)}$ or $M=M^{(i-1)}$).

Subsequently, a setting or calibration of the zero position follows, as described above.

The individual iterations adaptively lead to improved matrices $M^{(i)}$, because in each step more precise positions $\phi$ of the intermediately stored measurement vectors $\vec{q}$ can be determined, so that the matrix Q is formed according to the predetermined criterion from more suitable measurement vectors $\vec{q}$ and thus leads to a more precise matrix M. The desired sense of rotation is already included in the start matrix M and does not change during the iterations.

Recalibration

The method also allows recalibration during normal operation, which is carried out in two steps (and is similar to the bootstrap process):

1. Capturing measurement results for the recalibration with the steps A to D of the normal operation with aid of the substeps:

1.1 Capturing and buffering measurement vectors $\vec{q}$ according to the steps A and B for a plurality of measurements, and 1.2 Calculating the corresponding positions $\phi$ according to the steps C and D and buffering these positions $\phi$ for all buffered measurement vectors $\vec{q}$.

2. The actual recalibration takes place with the following steps 2.1 to 2.4

2.1 Selecting m buffered measurement vectors $\vec{q}$, the corresponding positions $\phi$ of which fulfill a predetermined criterion, 2.2 Rebuilding the matrix Q from the selected measurement vectors $\vec{q}$.

2.3 Rebuilding the matrix M, from the matrix Q, and 2.4 given the case, redetermining the zero position.

The predetermined criterion comprises preferably one or more of the following criteria:

the positions $\phi$ are distributed over the entire range from 0 to $2\pi$, the positions $\phi$ are equally distributed within a predetermined tolerance criterion, the measurement vectors $\vec{q}$ are sorted in ascending or in descending order of the positions $\phi$.

A large number of measurement vectors improves the calibration when the positions $\phi$ are not equidistributed.

Uniform distribution within a given tolerance criterion means that the k=1 to m positions $\phi_k$ of the selected measurement vectors $\vec{q}_k$ correspond up to a defined tolerance $\Delta\phi$ to the values $$\frac{(k-1)\cdot 2\pi}{m},$$

i.e. it is $$\left|\phi_k - \frac{(k-1)\cdot 2\pi}{m}\right| < \Delta\phi.$$

Plausibility Check

The position of the sensor chip 3 may change over time relative to the position of the rotation axis 1 or the axis x. In order to recognize this, the method can be extended by a plausibility check, as long as the dimension n of the vector space of the measurement vectors is n>2. The method requires a further n×n matrix C, which is determined in the calibration phase and used in normal operation for the plausibility check.

The calibration phase then additionally comprises the following step:

Forming the matrix C from the sub-matrix $\tilde{V}$ according to $$C = \mathbb{I} - \tilde{V}\cdot\tilde{V}^T$$

This equation reads written in full:

$$\begin{pmatrix} C_{11} & \ldots & C_{1n} \\ \vdots & & \vdots \\ C_{n1} & \ldots & C_{nn} \end{pmatrix} = \begin{pmatrix} 1 & & \\ & \ddots & \\ & & 1 \end{pmatrix} - \begin{pmatrix} V_{11} & \ldots & V_{1h} \\ \vdots & & \vdots \\ V_{n1} & \ldots & V_{nh} \end{pmatrix} \cdot \begin{pmatrix} V_{11}^T & \ldots & V_{1n}^T \\ \vdots & & \vdots \\ V_{h1}^T & \ldots & V_{hn}^T \end{pmatrix}$$

The normal operation additionally comprises the following step E:

E) calculating a check value with the substeps E.1 to E.3:

E.1 calculating a vector $\vec{d}$ to $$\vec{d} = C\vec{q}$$

This equation reads written in full:

$$\begin{pmatrix} d_1 \\ \vdots \\ d_n \end{pmatrix} = \begin{pmatrix} C_{11} & \ldots & C_{1n} \\ \vdots & & \vdots \\ C_{n1} & \ldots & C_{nn} \end{pmatrix} \cdot \begin{pmatrix} q_1 \\ \vdots \\ q_n \end{pmatrix}$$

E.2 calculating a check value v from the vector $\vec{d}$

The check value can for example be the quantity $$v = \sqrt{\frac{\sum_{i=1}^{N_s} d_i^2}{\sum_{i=1}^{N_s} q_i^2}}.$$

The check value can also be another quantity, in particular one which has the properties of a vector norm. A vector norm typically has the following properties:

(i) $v(\vec{d})=0$ exactly then, when $\vec{d}=\vec{0}$ (zero vector), (ii) for each $R\in\mathbb{R}$ (set of real numbers) is $v(R\cdot\vec{d})=|R|\cdot v(\vec{d})$, and (iii) for all vectors $\vec{d}_1,\vec{d}_2$ is $v(\vec{d}_1+\vec{d}_2)\leq v(\vec{d}_1)+v(\vec{d}_2)$.

The check value can also be a quantity, which only fulfills the properties (i) and (ii) of such a vector norm.

E.3 triggering a predetermined action, if the check value v exceeds a predetermined value.

Figure 9:
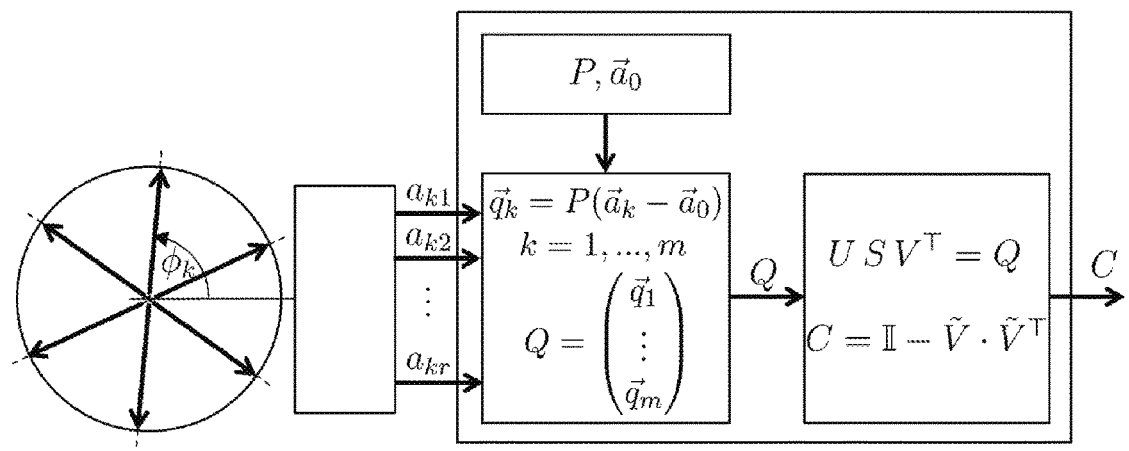

FIG. 9 illustrates the determination of the matrix C in the calibration phase. This calculation proceeds until the determination of the three matrices $\tilde{U}$, $\tilde{S}$ and $\tilde{V}^T$ analogously to the determination of the matrix M. The matrix C is then calculated, in that the product of the sub-matrix $\tilde{V}$ of the matrix V with its transposed $\tilde{V}^T$ is subtracted from the unit matrix.

Figure 10:
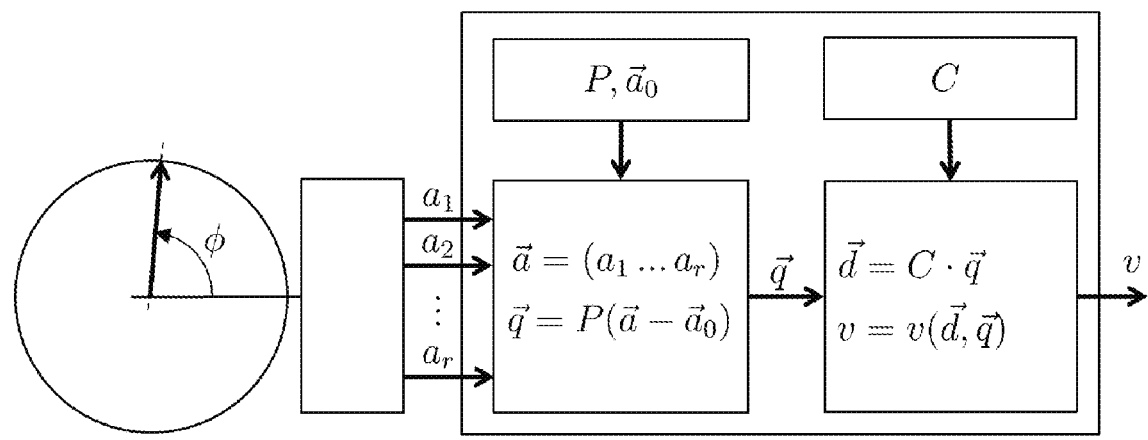

FIG. 10 illustrates the plausibility check. This check is carried out in normal operation. This calculation proceeds until the determination of $\vec{q}$ analogously to the calculation of the position (FIG. 6). For the plausibility check, the n-component vector $\vec{d}$ is calculated from the measurement vector $\vec{q}$ by means of the matrix C and from this finally the check value v.

Position Determination and External Field Suppression in the Special Case n=2 and r>n The determination of the position $\phi$ of a rotating or linearly moving position indicator may include an external field compensation, with which the projection matrix P maps the signal vectors of the dimension r on measurement vectors of the dimension n=2, and a calculation of the position a from the components $q_1$ and $q_2$ of a measurement vector $\vec{q}$ according to a classical method. The determination of the projection matrix P takes place in a calibration phase according to the above-described variant 1 with the values b=r−2 and c=b.

In normal operation the determination of the position $\phi$ takes place as follows:

A) Detecting the sensor signals $a_1$ to $a_r$ of the sensors (4) and forming a signal vector $\vec{a}=((a_1, \ldots, a_r)$.

B) Forming a measurement vector $\vec{q}$ according to $\vec{q}=g(\vec{a})$, wherein $g(\vec{a})=P\cdot\vec{a}$, if (only) an external field correction is performed, or $g(\vec{a})=P\cdot(\vec{a}-\vec{a}_0)$, if an offset and an external field correction is performed.

The vector $\vec{q}$ is a 2-component vector with the components $q_1$ and $q_2$. The calculation of the vector $\vec{p}$ according to $\vec{p}=M\cdot\vec{q}$ simplifies in this case to $\vec{p}=\vec{q}$, because in this special case the matrix M is the unit matrix.

If the movement of the position indicator provides a sequence of measurement vectors whose tips lie on a circle or circular arc, then the step follows:

C) Determining the position $\phi$ from the component $p_1$ and $p_2$ of the vector $\vec{p}$ by means of a predetermined function $f(\vec{p})$ to $\phi=f(\vec{p})=f(p_1,p_2)$, wherein the predetermined function $f(q=f(q_1,q_2)$ is based on the equations $q_1=\cos(\phi)$ and $q_2=\sin(\phi)$.

If the movement of the position indicator provides a sequence of measurement vectors whose tips lie on an ellipse, then the calibration phase has to be supplemented such that the parameters of the ellipse are determined after the determination of the projection matrix P, so that then the calculation of the position $\phi$ can take place on the basis of the values $q_1$ and $q_2$ and the parameters of the ellipse. The measurement value pairs $q_1$ and $q_2$ of the measurement vector $\vec{q}$ can be processed in the calibration phase as well as in normal operation, for example, according to the method of the international publication WO 2005124286 A1, wherein the values $q_1$ and $q_2$ correspond to the measurement values which are designated there as measurement value pairs $(x_i,y_i)$ with i=1, ..., N, or according to any other known method for approximately sine or cosine shaped measurement signals. I.e. also here a function $f(\vec{q})$ can be determined which delivers the position $\phi$ to $\phi=f(\vec{q})$.

This method enables the separation of external field detection and position determination in a manner in which it is not necessary to position the sensors very precisely and to adjust their sensitivity, and with which no separation in sensors for the determination of the position and in sensors for the determination of external fields is necessary.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims and their equivalents.

What is claimed is:

1. A system comprising:

a sensor chip comprising a plurality, r, of magnetic field sensors, a rotationally moveable or linearly displaceable position indicator having a magnet configured to produce a periodically changing magnetic field at the locations of the magnetic field sensors when the magnet is moved or displaced, respectively, and a position measuring system operated in two modes, a first mode and a second mode, the first mode being a calibration mode and the second mode being a measurement mode, the position measuring system operated at first in the calibration mode and then in the measurement mode;

the calibration mode of operation configured to determine a calibration matrix M, the calibration matrix M being a 2×n matrix, using one of:

A) (1) detecting the sensor signals $a_{k1}$ to $a_{kr}$ of the magnetic field sensors for a predetermined number of k=1 to m≥3 positions of the position indicator, (2) forming m signal vectors $\vec{a}_k=(a_{k1}, \ldots, a_{kr})$ from the sensor signals with k=1 to m, (3) forming m measurement vectors $\vec{q}_k$ with k=1 to m according to a predetermined function g to $\vec{q}_k=g(\vec{a}_k)$, (4) forming a matrix Q according to $$Q = \begin{pmatrix} \vec{q}_1 \\ \vdots \\ \vec{q}_m \end{pmatrix},$$

and (5) determining the matrix M from the matrix Q in such a way, that the transformation $\vec{p}=M\cdot\vec{q}$ is a linear mapping, which maps each of the m measurement vectors $\vec{q}_k$ on a 2-component vector $\vec{p}_k$, wherein the tips of the vectors $\vec{p}_k$ substantially lie on a circle or on a circular arc, or:

B) (1) setting an index i=0 and configuring a predetermined starting matrix $M^{(0)}$, the matrix $M^{(0)}$ being a 2×n matrix,
  (2) detecting and storing a plurality of measurement vectors q according to the steps A and B of the measurement mode of operation,
  (3) repeatedly executing the following steps:
    (a) setting the calibration matrix M to $M=M^{(i)}$
    (b) increasing the index i by 1,
    (c) calculating the positions $\phi$ of the stored measurement vectors $\vec{q}$ according to the steps C and D of the measurement mode of operation,
    (d) selecting a number of k=1 to m of the stored measurement vectors $\vec{q}_k$, the corresponding positions $\phi_k$ of which fulfill a predetermined criterion,
    (e) forming a matrix Q according to $$Q = \begin{pmatrix} \vec{q}_1 \\ \vdots \\ \vec{q}_m \end{pmatrix},$$

(f) determining a new matrix $M^{(i)}$ from the matrix Q in such a way, that the transformation $\vec{p}=M\cdot\vec{q}$ is a linear mapping, which maps each of the m selected measurement vectors $\vec{q}_k$ on a 2-component vector $\vec{p}_k$,
  until the matrix $M^{(i)}$ within a predetermined tolerance no longer differs from the matrix $M^{(i-1)}$, whereby the tips of the vectors $\vec{p}_k$ with increasing index i substantially come to lie on a circle or on a circular arc; and
  the measurement mode of operation configured to use the calibration matrix M to repeatedly determine a position $\phi$ of the position indicator by:
(A) detecting the sensor signals $a_1$ to $a_r$ of the magnetic field sensors and forming a signal vector $\vec{a}=(a_1, \ldots, a_r)$,
(B) forming a measurement vector $\vec{q}$ according to the predetermined linear function g to $\vec{q}=g(\vec{a})$, wherein the measurement vector q has a number of n components, with 2≤n≤r,
(C) calculating a vector $\vec{p}=M\cdot\vec{q}$, wherein $\vec{p}$ is a 2-component vector with the components $p_1$ and $p_2$, and
(D) determining the position $\phi$ by means of a predetermined function $f(\vec{p})$ to $\phi=f(\vec{p})$,
wherein the predetermined function $f(\vec{p})=f(p_1,p_2)$ is based on the equations $p_1=\cos(\phi)$ and $p_2=\sin(\phi)$.

2. The system of claim 1, wherein the value r is at least 3.

3. The system of claim 1, wherein the determining the calibration matrix M from the matrix Q comprises:
  determining two matrices U and B, which fulfill the equation Q=U·B, wherein U is a m×2 matrix with $U^T\cdot U=I$, and B is a symmetrical, positive definite 2×2 matrix, by
  forming an auxiliary matrix D so that $D=Q^T\cdot Q$,
  calculating the matrix B so that $B=D^{1/2}$,
  forming an auxiliary matrix H so that $H=B^{-1}$, and
  forming the calibration matrix M so that M=N H, wherein $$N = \begin{pmatrix} d & 0 \\ 0 & 1 \end{pmatrix}$$

is an auxiliary matrix, whose parameter d has the value 1 or −1.

4. The system of claim 2, wherein the determining the calibration matrix M from the matrix Q comprises:
  determining two matrices U and B, which fulfill the equation Q=U·B, wherein U is a m×2 matrix with $U^T\cdot U=I$, and B is a symmetrical, positive definite 2×2 matrix, by
  forming an auxiliary matrix D so that $D=Q^T\cdot Q$,
  calculating the matrix B so that $B=D^{1/2}$,
  forming an auxiliary matrix H so that $H=B^{-1}$, and
  forming the calibration matrix M so that M=N H, wherein $$N = \begin{pmatrix} d & 0 \\ 0 & 1 \end{pmatrix}$$

is an auxiliary matrix, whose parameter d has the value 1 or −1.

5. The system of claim 1, wherein the determining the calibration matrix M from the matrix Q comprises:
  determining three matrices U, S and $V^T$, which fulfill the equation $Q=U\cdot S\cdot V^T$,
  wherein U is an orthogonal m×m matrix, $V^T$ is in orthogonal n×n matrix and S is a positive semidefinite m×n diagonal matrix, the diagonal elements of which are sorted according to decreasing size,
  forming sub-matrices $\tilde{U}$, $\tilde{S}$ and $\tilde{V}^T$ in dependence of a predetermined parameter h,
  which fulfills the condition 2≤h≤l, wherein 1<min(m,n) designates the number of diagonal elements of S which are different from zero and wherein
    $\tilde{U}$ is that m×h sub-matrix of the matrix U, which is formed by discarding the columns h+1 to m,
    $\tilde{S}$ is that h×h sub-matrix of the matrix S, which is formed by discarding the rows h+1 to m and discarding the columns h+1 to n, and
    $\tilde{V}^T$ is that h×n sub-matrix of the matrix $V^T$, which is formed by discarding the rows h+1 to n,
  and if n>2, forming an auxiliary matrix H from elements of the sub-matrices $\tilde{U}$, $\tilde{S}$ and $\tilde{V}^T$, or in the special case of n=2 alternatively forming the auxiliary matrix H to $H=\tilde{S}^{-1}\tilde{V}^T$,
  and forming the calibration matrix M so that M=N H, wherein $$N = \begin{pmatrix} d & 0 \\ 0 & 1 \end{pmatrix}$$

is an auxiliary matrix, whose parameter d has the value 1 or −1.

6. The system of claim 5, wherein the forming an auxiliary matrix if from elements of the sub-matrices $\tilde{U}$, $\tilde{S}$ and $\tilde{V}^T$ comprises:
  forming an auxiliary matrix W,
    if the measurement vectors are present in an arbitrary order with the steps:
      calculating values $\alpha_i = a\tan 2(U_{12}U_{i1}-U_{11}U_{i2}, U_{12}U_{i2}+U_{11}U_{i1})$ for i=1 to m, calculating the permutation k(i), which sorts the $\alpha_i$-values according to their size, so that $\alpha_{k(i)} > \alpha_{k(i-1)}$ for i=2, ..., m, and forming the elements of the auxiliary matrix W so that $$W_{i,k(j)} = \begin{cases} \sin\left(\frac{2\pi(j-1)}{m}\right), & i=1 \\ \cos\left(\frac{2\pi(j-1)}{m}\right), & i=2 \end{cases},$$

for j=1 to m, if the m positions of the position indicator are distributed over approximately the entire range from 0 to $2\pi$, or $$W_{i,k(j)} = \begin{cases} \sin\left(\frac{(\phi_{max}-\phi_{min})(j-1)}{m}\right), & i=1 \\ \cos\left(\frac{(\phi_{max}-\phi_{min})(j-1)}{m}\right), & i=2 \end{cases},$$

for j=1 to m if the m positions of the position indicator occupy only a circular arc with $\phi \in [\phi_{min}, \phi_{max}]$, or $$W_{i,k(j)} = \begin{cases} \sin\left(e \cdot \frac{(\phi_{max}-\phi_{min})(j-1)}{m}\right), & i=1 \\ \cos\left(e \cdot \frac{(\phi_{max}-\phi_{min})(j-1)}{m}\right), & i=2 \end{cases},$$

for j=1 to m, if the m positions of the position indicator occupy only a circular arc with $\phi \in [\phi_{min}, \phi_{max}]$ and the position indicator has a multipole character, wherein the parameter e characterizes the multipole character, or if the measurement vectors $\vec{q}_k$ with k=1 in are sorted in ascending or descending order according to their corresponding position $\phi_k$, forming the elements of the auxiliary matrix W with the auxiliary quantity $f=1$ for ascending and $f=-1$ for descending order so that $$W_{ij} = \begin{cases} \sin\left(f \cdot \frac{2\pi(j-1)}{m}\right), & i=1 \\ \cos\left(f \cdot \frac{2\pi(j-1)}{m}\right), & i=2 \end{cases},$$

for j=1 to m, if the m positions of the position indicator are distributed over approximately the entire range from 0 to $2\pi$, or $$W_{ij} = \begin{cases} \sin\left(f \cdot \frac{(\phi_{max}-\phi_{min})(j-1)}{m}\right), & i=1 \\ \cos\left(f \cdot \frac{(\phi_{max}-\phi_{min})(j-1)}{m}\right), & i=2 \end{cases},$$

for j=1 to m if the m positions of the position indicator occupy only a circular arc with $\phi \in [\phi_{min}, \phi_{max}]$, or $$W_{ij} = \begin{cases} \sin\left(fe \cdot \frac{(\phi_{max}-\phi_{min})(j-1)}{m}\right), & i=1 \\ \cos\left(fe \cdot \frac{(\phi_{max}-\phi_{min})(j-1)}{m}\right), & i=2 \end{cases},$$

for j=1 to m if the m positions of the position indicator occupy only a circular arc with $\phi \in [\phi_{min}, \phi_{max}]$ and the position indicator has a multipole character, wherein the parameter e characterizes the multipole character, forming an auxiliary matrix T so that $T = W \tilde{U}$, and forming the auxiliary matrix H so that $H = T \tilde{S}^{-1} \tilde{V}^T$.

7. The system of claim 2, wherein the determining the calibration matrix M from the matrix Q comprises:

determining three matrices U, S and $V^T$, which fulfill the equation $Q = U \cdot S \cdot V^T$, wherein U is an orthogonal in m×m matrix, $V^T$ is in orthogonal n×n matrix and S is a positive semidefinite m×n diagonal matrix, the diagonal elements of which are sorted according to decreasing size, forming sub-matrices $\tilde{U}$, $\tilde{S}$ and $\tilde{V}^T$ in dependence of a predetermined parameter h, which fulfills the condition $2 \leq h \leq l$, wherein $l \leq \min(m,n)$ designate the number of diagonal elements of S which are different from zero and wherein $\tilde{U}$ is that m×h sub-matrix of the matrix U, which is formed by discarding the columns h+1 to m, $\tilde{S}$ is that h×h sub-matrix of the matrix S, which is formed by discarding the rows h+1 to m and discarding the columns h+1 to n, and $\tilde{V}^T$ is that h×n sub-matrix of the matrix $V^T$, which is formed by discarding the rows h+1 to n, and, if $n \geq 2$, forming an auxiliary matrix H from elements of the sub-matrices $\tilde{U}$, $\tilde{S}$ and $\tilde{V}^T$, or, in the special case of n=2, alternatively forming the auxiliary matrix H so that $H = \tilde{S}^{-1} \tilde{V}^T$, and forming the calibration matrix M so that $M = N \, H$, wherein $$N = \begin{pmatrix} d & 0 \\ 0 & 1 \end{pmatrix}$$

is an auxiliary matrix, whose parameter d has the value 1 or −1.

8. The system of claim 7, wherein the forming an auxiliary matrix TI from elements of the sub-matrices $\tilde{U}$, $\tilde{S}$ and $\tilde{V}^T$ comprises:

forming an auxiliary matrix W, if the measurement vectors are present in an arbitrary order with the steps:

calculating values $\alpha_i = a \tan 2(U_{12}U_{i1} - U_{11}U_{i2}, U_{12}U_{i2} + U_{11}U_{i1})$ for i=1 to m, calculating the permutation k(i), which sorts the $\alpha_i$-values according to their size, so that $\alpha_{k(i)} > \alpha_{k(i-1)}$ for i=2, ..., m, and forming the elements of the auxiliary matrix W so that $$W_{i,k(j)} = \begin{cases} \sin\left(\frac{2\pi(j-1)}{m}\right), & i = 1 \\ \cos\left(\frac{2\pi(j-1)}{m}\right), & i = 2 \end{cases},$$

for j=1 to m, if the m positions of the position indicator are distributed over approximately the entire range from 0 to $2\pi$, or $$W_{i,k(j)} = \begin{cases} \sin\left(\frac{(\phi_{max} - \phi_{min})(j-1)}{m}\right), & i = 1 \\ \cos\left(\frac{(\phi_{max} - \phi_{min})(j-1)}{m}\right), & i = 2 \end{cases},$$

for j=1 to m, if the m positions of the position indicator occupy only a circular arc with $\phi \in [\phi_{min}, \phi_{max}]$, or $$W_{i,k(j)} = \begin{cases} \sin\left(e \cdot \frac{(\phi_{max} - \phi_{min})(j-1)}{m}\right), & i = 1 \\ \cos\left(e \cdot \frac{(\phi_{max} - \phi_{min})(j-1)}{m}\right), & i = 2 \end{cases},$$

for j=1 to m, if the m positions of the position indicator occupy only a circular arc with $\phi \in [\phi_{min}, \phi_{max}]$ and the position indicator has a multipole character, wherein the parameter e characterizes the multipole character, or if the measurement vectors $\vec{q}_k$ with k=1, . . . , m are sorted in ascending or descending order according to their corresponding position $\phi_k$, forming the elements of the auxiliary matrix TV with the auxiliary quantity f=1 for ascending and f=−1 for descending order so that $$W_{ij} = \begin{cases} \sin\left(f \cdot \frac{2\pi(j-1)}{m}\right), & i = 1 \\ \cos\left(f \cdot \frac{2\pi(j-1)}{m}\right), & i = 2 \end{cases},$$

for j=1 to m, if the m positions of the position indicator are distributed over approximately the entire range from 0 to $2\pi$, or $$W_{ij} = \begin{cases} \sin\left(f \cdot \frac{(\phi_{max} - \phi_{min})(j-1)}{m}\right), & i = 1 \\ \cos\left(f \cdot \frac{(\phi_{max} - \phi_{min})(j-1)}{m}\right), & i = 2 \end{cases},$$

for j=i to m if the m positions of the position indicator occupy only a circular arc with $\phi \in [\phi_{min}, \phi_{max}]$, or $$W_{ij} = \begin{cases} \sin\left(fe \cdot \frac{(\phi_{max} - \phi_{min})(j-1)}{m}\right), & i = 1 \\ \cos\left(fe \cdot \frac{(\phi_{max} - \phi_{min})(j-1)}{m}\right), & i = 2 \end{cases},$$

for j=1 to m if the m positions of the position indicator occupy only a circular arc with $\phi \in [\phi_{min}, \phi_{max}]$ and the position indicator has a multipole character, wherein the parameter e characterizes the multipole character, forming an auxiliary matrix T so that T=W $\tilde{U}$, and forming the auxiliary matrix H so that H=T $\tilde{S}^{-1}$ $\tilde{V}^T$.

9. The system of claim 2, wherein $f(p_1,p_2)$=a tan $2(p_2, p_1) - \phi_0$, wherein $\phi_0$ is a quantity which characterizes a zero position of the position measuring system.

10. The system of claim 7, wherein $f(p_1,p_2)$=a tan $2(p_2, p_1) - \phi_0$, wherein $\phi_0$ is a quantity which characterizes a zero position of the position measuring system.

11. The system of claim 8, wherein $f(p_1,p_2)$=a tan $2(p_2, p_1) - \phi_0$, wherein $\phi_0$ is a quantity which characterizes a zero position of the position measuring system.

12. The system of claim 2, wherein the function $g(\vec{a})$ is one of the following functions:
1) $g(\vec{a}) = \vec{a}$,
2) $g(\vec{a}) = \vec{a} - \vec{a}_0$,
3) $g(\vec{a}) = P \cdot \vec{a}$, or
4) $g(\vec{a}) = P \cdot (\vec{a} - \vec{a}_0)$, wherein $\vec{a}_0$ designates an offset vector and P a projection matrix.

13. The system of claim 7, wherein the function $g(\vec{a})$ is one of the following functions:
1) $g(\vec{a}) = \vec{a}$,
2) $g(\vec{a}) = \vec{a} - \vec{a}_0$,
3) $g(\vec{a}) = P \cdot \vec{a}$, or
4) $g(\vec{a}) = P \cdot (\vec{a} - \vec{a}_0)$, wherein $\vec{a}_0$ designates an offset vector and P a projection matrix.

14. The system of claim 13, wherein $g(\vec{a}) = P \cdot \vec{a}$ or $g(\vec{a}) = P \cdot (\vec{a} - \vec{a}_0)$ and wherein the projection matrix P is determined in the calibration mode of operation, either (i) in absence of the position indicator with the steps:

executing the following steps for a predetermined number of different external fields v=1 to b≥1, wherein the number h fulfills the condition b≤r−2:

applying the external field, detecting the sensor signals $a_1$ to $a_r$ and forming a signal vector $\vec{a} = (a_1, \ldots, a^r)$, and forming an external field vector $\vec{f}_v = \vec{a}$ or, given the case, of an offset compensated external field vector $\vec{f}_v = \vec{a} - \vec{a}_0$, or (ii) in presence of the position indicator with the steps:

moving the position indicator to a fixed position, detecting the sensor signals $a_1$ to $a_r$ and storing as vector $\vec{a}_F = (a_1, \ldots, a_r)$, executing the following steps for a predetermined number of different external fields v=1 to b≥1, wherein the number b fulfills the condition b≤r−2:

applying the external field, detecting the sensor signals $a_1$ to $a_r$ and forming a signal vector $\vec{a}=(a_1, \ldots, a_r)$, and forming an external field vector $\vec{f}_v=\vec{a}-\vec{a}_F$ or, given the case, of an offset compensated external field vector $\vec{f}_v=\vec{a}-\vec{a}_F-\vec{a}_0$, and both in the presence and absence of the position indicator either with the further steps:

forming of c orthonormal vectors $\vec{g}_1, \ldots, \vec{g}_c$ of the vector space spanned by the external field vectors $\vec{f}_1, \ldots \vec{f}_b$, wherein c≤b, complementing the c vectors $\vec{g}_1, \ldots, \vec{g}_c$ with n=r−c further vectors $\vec{g}_{c+1}, \ldots, \vec{g}_{c+n}$ to a complete, orthonormal basis of the r-dimensional vector space of the signal vectors, and forming the projection matrix P so that $$P = \begin{pmatrix} \vec{g}_{c+1} \\ \vdots \\ \vec{g}_{c+n} \end{pmatrix}.$$

or with the further steps:

forming an orthonormal basis of c vectors $\vec{g}_1, \ldots, \vec{g}_c$ of the vector space spanned by the external field vectors $\vec{f}_1, \ldots, \vec{f}_b$, and forming the projection matrix P so that $$P = \mathbb{1} - \sum_{i=1}^{c} \vec{g}_i \otimes \vec{g}_i,$$

wherein $\vec{g}_i \otimes \vec{g}_i$ are the tensor products of the vectors $\vec{g}_i$.

15. The system of claim 8, wherein the function g(d) is one of the following functions:
1) $g(\vec{a})=\vec{a}$,
2) $g(\vec{a})=\vec{a}-\vec{a}_0$,
3) $g(\vec{a})=P\cdot\vec{a}$, or
4) $g(\vec{a})=P\cdot(\vec{a}-\vec{a}_0)$, wherein $\vec{a}_0$ designates an offset vector and P a projection matrix.

16. The system of claim 15, wherein $g(\vec{a})=P\cdot\vec{a}$ or $g(\vec{a})=P\cdot(\vec{a}-\vec{a}_0)$ and wherein the projection matrix P is determined in the calibration phase, either (i) in absence of the position indicator with the steps:

executing the following steps for a predetermined number of different external fields v=1 to b≥1, wherein the number b fulfills the condition b≤r−2:
applying the external field,
detecting the sensor signals $\vec{a}_1$ to $\vec{a}_r$ and forming a signal vector $\vec{a}=(a_1, \ldots, a_r)$, and forming an external field vector $\vec{f}_v=\vec{a}$ or, given the case, of an offset compensated external field vector $\vec{f}_v=\vec{a}-\vec{a}_0$, or (ii) in presence of the position indicator with the steps:

moving the position indicator to a fixed position,
detecting the sensor signals $a_1$ to $a_r$ and storing them as vector $\vec{a}_F=(a_1, \ldots, a_r)$,
executing the following steps for a predetermined number of different external fields v=1 to b≥1, wherein the number h fulfills the condition b≤r−2:
applying the external field,
detecting the sensor signals $a_1$ to $a_r$ and forming a signal vector $\vec{a}=(a_1, \ldots, a_r)$, and forming an external field vector $\vec{f}_v=\vec{a}-\vec{a}_F$ or, given the case, of an offset compensated external field vector $\vec{f}_v=\vec{a}-\vec{a}_F-\vec{a}_0$, and both in the presence and absence of the position indicator either with the further steps:

forming c orthonormal vectors $\vec{g}_1, \ldots, \vec{g}_c$ of the vector space spanned by the external field vectors $\vec{f}_1, \ldots, \vec{f}_b$, wherein c≤b, complementing the c vectors $\vec{g}_1, \ldots, \vec{g}_c$ with n=r−c further vectors $\vec{g}_{c+1}, \ldots, \vec{g}_{c+n}$ to a complete, orthonormal basis of the r-dimensional vector space of the signal vectors, and forming the projection matrix P so that $$P = \begin{pmatrix} \vec{g}_{c+1} \\ \vdots \\ \vec{g}_{c+n} \end{pmatrix}.$$

or with the further steps:

forming an orthonormal basis of c vectors $\vec{g}_1, \ldots, \vec{g}_c$ of the vector space spanned by the external field vectors $\vec{f}_1, \ldots, \vec{f}_b$, and forming the projection matrix P so that $$P = \mathbb{1} - \sum_{i=1}^{c} \vec{g}_i \otimes \vec{g}_i,$$

wherein $\vec{g}_i \otimes \vec{g}_i$ are the tensor products of the vectors $\vec{g}_i$.

17. The system of claim 5, wherein a matrix C is formed in the calibration mode of operation so that $C = I - \tilde{V}\cdot\tilde{V}^T$, and wherein in the measurement mode of operation a check value v is formed with the steps forming a vector $\vec{d}=C\,\vec{q}$, calculating the check value v from the vector $\vec{d}$, and triggering a predetermined action, if the check value v exceeds a predetermined value.

18. The system of claim 6, wherein a matrix C is formed in the calibration phase so that $C = I - \tilde{V}\cdot\tilde{V}^T$, and wherein in the measurement mode of operation a check value v is formed with the steps forming a vector $\vec{d}=C\,\vec{q}$, calculating the check value v from the vector $\vec{d}$, and triggering a predetermined action, if the check value v exceeds a predetermined value.

19. The system of claim 1, further comprising:
periodically, while engaged in the measurement mode of operation, capturing and buffering a plurality of measurement vectors (and of the corresponding positions c which have been calculated according to the steps C and D of the measurement mode of operation, and
performing a recalibration by means of the steps:
  selecting a number of buffered measurement vectors $\vec{q}$, the corresponding positions ϕ of which fulfill a predetermined criterion,
  rebuilding the matrix Q from the selected measurement vectors $\vec{q}$, and
  rebuilding the calibration matrix M.

20. A system comprising:
a sensor chip comprising a plurality, r, of magnetic field sensors,
a rotationally moveable or linearly displaceable position indicator having a magnet configured to produce a periodically changing magnetic field at the locations of the magnetic field sensors when the magnet is moved or displaced, respectively, and
a position measuring system operated in two modes, a first mode and a second mode, the first mode being a calibration mode and the second mode being a measurement mode, the position measuring system operated at first in the calibration mode and then in the measurement mode;
the calibration mode of operation configured to determine a projection matrix P either (i) in absence of the position indicator with the steps:
executing the following steps for a predetermined number of different external fields v=1 to b=r−2:
  applying the external field,
  detecting the sensor signals $a_1$ to $a_r$ and forming a signal vector $\vec{a}=(a_1, \ldots, a_r)$, and
  forming an external field vector $\vec{f}_v = \vec{a}$ or, given the case, of an offset compensated external field vector $\vec{f}_v = \vec{a} - \vec{a}_0$,
or (ii) in presence of the position indicator with the steps:
  moving the position indicator in a fixed position,
  detecting the sensor signals $a_1$ to $a_r$ and storing as vector $\vec{a}_F = (a_1, \ldots, a_r)$,
  executing the following steps for a predetermined number of different external fields v=1 to b≥1, wherein the number b fulfills the condition b=r−2:
    applying the external field,
    detecting the sensor signals $a_1$ to $a_r$ of the sensors and forming a signal vector $\vec{a}=(a_1, \ldots, a_r)$, and
    forming an external field vector $\vec{f}_v = \vec{a} - \vec{a}_F$ or, given the case, of an offset compensated external field vector $\vec{f}_v = \vec{a}_F - a_0$,
and both in the presence and absence of the position indicator with the further steps:
  forming c orthonormal vectors $\vec{g}_1, \ldots, \vec{g}_c$ of the vector space spanned by the external field vectors $\vec{f}_1, \ldots, \vec{f}_b$, wherein c=b,
  complementing the c vectors $\vec{g}_1, \ldots, \vec{g}_c$ with two further vectors $\vec{g}_{c+1}, \vec{g}_{c+2}$ to a complete, orthonormal basis of the r-dimensional vector space of the signal vectors, and forming the projection matrix P so that $$P = \begin{pmatrix} \vec{g}_{c+1} \\ \vec{g}_{c+2} \end{pmatrix},$$

and
the measurement mode of operation configured to use the projection matrix P to repeatedly determine a position ϕ of the position indicator by:
(A) detecting the sensor signals $a_1$ to $a_r$ of the sensors and forming based thereon a signal vector $\vec{a}=(a_1, \ldots, a_r)$,
(B) forming a measurement vector $\vec{q}$ according to a predetermined linear function g to $\vec{q}=g(\vec{a})$, wherein the measurement vector $\vec{q}$ has a number of n=2 components, wherein the function $g(\vec{a})$ is one of the following functions:
  1) $g(\vec{a})=P \cdot \vec{a}$, or
  2) $g(\vec{a})=P \cdot (\vec{a} - \vec{a}_0)$,
wherein $\vec{a}_0$ designates an offset vector, and P the projection matrix,
(C) determining the position ϕ of the position indicator by means of a predetermined function $f(\vec{q})$ so that $\phi = f(\vec{q})$.

21. A system comprising:
a rotationally moveable position indicator having a geometrically structured, electrically conductive disk,
at least three coils, wherein at least one of the at least three coils is used as a transmitting coil fed with an alternating current to produce a magnetic field and the others of the at least three coils are used as receiving coils, the receiving coils being a number, r, of magnetic field sensors, the magnetic field generated by the transmitting coil(s) inducing in each receiving coil a voltage having an amplitude varying harmonically when the disk is rotated,
a position measuring system operated in two modes, a first mode and a second mode, the first mode being a calibration mode and the second mode being a measurement mode, the position measuring system operated at first in the calibration mode and then in the measurement mode;
the calibration mode of operation configured to determine a calibration matrix M, the calibration matrix M being a 2×n matrix, using one of:
A) (1) detecting the sensor signals $a_{k1}$ to $a_{kr}$ of the magnetic field sensors for a predetermined number of k=1 to m≥3 positions of the position indicator,
  (2) forming m signal vectors $\vec{a}_k=(a_{k1}, \ldots a_{kr})$ from the sensor signals with k=1 to m,
  (3) forming m measurement vectors $\vec{q}_k$ with k=1 to m according to a predetermined function g to $\vec{q}_k = g(\vec{a}_k)$,
  (4) forming a matrix Q according to $$Q = \begin{pmatrix} \vec{q}_1 \\ \vdots \\ \vec{q}_m \end{pmatrix},$$

and (5) determining the matrix M from the matrix Q in such a way, that the transformation $\vec{p}=M\cdot\vec{q}$ is a linear mapping, which maps each of the m measurement vectors $\vec{q}_k$ on a 2-component vector $\vec{p}_k$, wherein the tips of the vectors $\vec{p}_k$ substantially lie on a circle or on a circular arc, or:

B) (1) setting an index i=0 and configuring a predetermined starting matrix $M^{(0)}$, the matrix $M^{(0)}$ being a 2×n matrix, (2) detecting and storing a plurality of measurement vectors q according to the steps A and B of the measurement mode of operation, (3) repeatedly executing the following steps:
  (a) setting the calibration matrix M to $M=M^{(i)}$
  (b) increasing the index i by 1,
  (c) calculating the positions ϕ of the stored measurement vectors $\vec{q}$ according to the steps C and D of the measurement mode of operation,
  (d) selecting a number of k=1 to m of the stored measurement vectors $\vec{q}k_i$ the corresponding positions $\phi_k$ of which fulfill a predetermined criterion,
  (e) forming a matrix Q according to $$Q = \begin{pmatrix} \vec{q}_1 \\ \vdots \\ \vec{q}_m \end{pmatrix},$$

(f) determining a new matrix $M^{(i)}$ from the matrix Q in such a way, that the transformation $\vec{p}=M\cdot\vec{q}$ is a linear mapping, which maps each of the m selected measurement vectors $\vec{q}_k$ on a 2-component vector $\vec{p}_k$, until the matrix $M^{(i)}$ within a predetermined tolerance no longer differs from the matrix $M^{(i-1)}$, whereby the tips of the vectors $\vec{p}_k$ with increasing index i substantially come to lie on a circle or on a circular arc; and the measurement mode of operation configured to use the calibration matrix M to repeatedly determine a position ϕ of the position indicator by:

(A) detecting the sensor signals $a_1$ to $a_r$ of the magnetic field sensors and forming a signal vector $\vec{a}=(a_1, \ldots, a_r)$, (B) forming a measurement vector $\vec{q}$ according to the predetermined linear function g to $\vec{q}=g(\vec{a})$, wherein the measurement vector $\vec{q}$ has a number of n components, with 2≤n≤r, (C) calculating a vector $\vec{p}=M\cdot\vec{q}$, wherein $\vec{p}$ is a 2-component vector with the components $p_1$ and $p_2$, and (D) determining the position ϕ by means of a predetermined function $f(\vec{p})$ to $\phi=f(\vec{p})$, wherein the predetermined function $f(\vec{p})=f(p_1,p_2)$ is based on the equations $p_1=\cos(\phi)$ and $p_2=\sin(\phi)$.

* * * * *